United States Patent
Jernigan, IV

(10) Patent No.: US 12,298,942 B2
(45) Date of Patent: May 13, 2025

(54) BOTTLENECK MANAGEMENT TECHNIQUES USING NON-DISRUPTIVE FILE MOVEMENT MECHANISMS IN DISTRIBUTED STORAGE ENVIRONMENTS

(71) Applicant: NetApp, Inc., San Jose, CA (US)

(72) Inventor: Richard Parvin Jernigan, IV, Sewickley, PA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/488,755

(22) Filed: Oct. 17, 2023

(65) Prior Publication Data
US 2025/0124004 A1     Apr. 17, 2025

(51) Int. Cl.
G06F 16/174     (2019.01)
G06F 16/16      (2019.01)

(52) U.S. Cl.
CPC ........ *G06F 16/1748* (2019.01); *G06F 16/162* (2019.01)

(58) Field of Classification Search
CPC ............................ G06F 16/1748; G06F 16/162
See application file for complete search history.

(56) References Cited

U.S. PATENT DOCUMENTS

| | | | |
|---|---|---|---|
| 7,991,734 B2 * | 8/2011 | Park | G06F 16/00 707/621 |
| 9,886,697 B1 * | 2/2018 | Sivertsen | G06Q 30/0241 |
| 2001/0018766 A1 | 8/2001 | Morita et al. | |
| 2003/0182330 A1 | 9/2003 | Manley et al. | |
| 2003/0182428 A1 | 9/2003 | Li et al. | |
| 2006/0114836 A1 * | 6/2006 | Pollin | H04L 1/24 370/252 |
| 2006/0265467 A1 | 11/2006 | Jang | |
| 2011/0060887 A1 | 3/2011 | Thatcher et al. | |
| 2012/0036161 A1 * | 2/2012 | Lacapra | G06F 16/13 707/781 |
| 2015/0370825 A1 * | 12/2015 | Outcalt | G06F 16/27 707/608 |

(Continued)

OTHER PUBLICATIONS

Non-Final Office Action mailed on Oct. 9, 2024 for U.S. Appl. No. 18/305,927, filed Apr. 24, 2023, 18 pages.

(Continued)

*Primary Examiner* — Etienne P Leroux
(74) *Attorney, Agent, or Firm* — Jaffery Watson Hamilton & DeSanctis LLP

(57) ABSTRACT

Approaches to data flow bottleneck management using caching mechanisms in a distributed storage environment are disclosed. A read request is received by a first data storage node having a first set of interface module(s), a first set of data management module(s), a first redirection layer, and a first set of data storage devices. The read request has a corresponding file to be read. The first redirection layer is checked for an entry corresponding to the file. The read request is routed based on a file characteristic corresponding to the read request if there is no corresponding entry in the first redirection layer or to a second data storage node based on the entry in the first redirection layer. Potential bottleneck conditions are monitored on the first node. A redirection layer entry in the first redirection layer is generated in response to determining that a bottleneck condition exists.

24 Claims, 20 Drawing Sheets

(56) References Cited

U.S. PATENT DOCUMENTS

| | | |
|---|---|---|
| 2019/0215358 A1 | 7/2019 | Kobayashi et al. |
| 2020/0301880 A1 | 9/2020 | George et al. |
| 2021/0049044 A1* | 2/2021 | Wong .................. G06F 16/1748 |
| 2024/0354281 A1 | 10/2024 | Jernigan et al. |

OTHER PUBLICATIONS

Non-Final Office Action mailed on Sep. 29, 2024 for U.S. Appl. No. 18/488,727, filed Oct. 17, 2023, 18 pages.

* cited by examiner

BOTTLENECK MANAGEMENT TECHNIQUES USING NON-DISRUPTIVE FILE MOVEMENT MECHANISMS IN DISTRIBUTED STORAGE ENVIRONMENTS

RELATED APPLICATIONS

This U.S. patent application is related to U.S. patent application Ser. No. 18/488,727 filed concurrently herewith and entitled "DATA FLOW BOTTLENECK MANAGEMENT TECHNIQUES USING CACHING MECHANISMS IN DISTRIBUTED STORAGE ENVIRONMENTS," by Richard Jernigan and U.S. patent application Ser. No. 18/305,927 filed Apr. 28, 2023 and entitled "NON-DISRUPTIVE FILE MOVEMENT WITHIN A DISTRIBUTED STORAGE SYSTEM," by Richard Jernigan, et al.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF SUMMARY

In an example, a write request is received at a first data storage node having a first set of interface module(s), a first set of data management module(s), and a first set of data storage devices. The write request has a corresponding file to be written. A non-disruptive file move is triggered in response to determining conditions on the first node indicate the bottleneck condition. The target file in the first constituent is converted to a multipart file in the first constituent with a file location for the new file in the first constituent in response to the trigger. A new file is created in the second constituent. Contents of the target file are moved to a new file on the second constituent while maintaining access to the target file via the associated file handle via access to the multipart file. The target file is deleted from the first constituent.

In an example, a subsequent request to move the new file from the second constituent to a third constituent is received. A new file is created in the third constituent. Contents of the new file in the second constituent are moved to the new file in the third constituent while maintaining access to the new file in the second constituent via the associated file handle and via access to the multipart file. The new file from the second constituent is deleted.

In an example, location information in a buffer tree for the multipart file is changed from indicating the target file in the first constituent to indicating the new file in the second constituent, and a buffer tree associated with the new file in the second constituent is updated to store inode data for the new file in the second constituent.

In an example, determining whether conditions on the first node indicate a bottleneck condition comprises applying a points-based analysis based on queue latency. In an example, the points-based analysis is a function of at least raw access count and access percentile. In an example, the raw access count and the access percentile are maintained in a bloom filter.

In an example, a private file is generated in the second constituent. Space is allocated for a buffer tree for the private file in the second constituent. A public file is created in the second constituent. The public file comprises the new file in the second constituent. The public file is linked to the buffer tree for the private file. The link is removed from the private file to the buffer tree.

In an example, the new file in the second constituent comprises a part inode file and the multipart file comprises at least a link to a parts catalog having links to one or more part inode files that each comprise a portion of user data previously stored in the multipart file.

In an example system, a first data storage node has a first set of interface module(s), a first set of data management module(s), and a first set of data storage devices. A second data storage node is coupled with the first data storage node. The second data storage node has a second set of interface module(s), a second set of data management module(s), and a second set of data storage devices. The first set of interface module(s) receive a write request having a corresponding file to be written, determine whether conditions on the first node indicate a bottleneck condition, trigger a non-disruptive file move in response to determining conditions on the first node indicate the bottleneck condition, convert the target file in the first constituent to a multipart file in the first constituent with a file location for the new file in the first constituent in response to the trigger, create a new file in the second constituent, cause the contents of the target file to be moved to a new file on the second constituent while maintaining access to the target file via the associated file handle via access to the multipart file, and delete the target file from the first constituent.

In an example system, a subsequent request to move the new file from the second constituent to a third constituent is received. A new file is created in the third constituent. Contents of the new file in the second constituent are moved to the new file in the third constituent while maintaining access to the new file in the second constituent via the associated file handle and via access to the multipart file. The new file from the second constituent is deleted.

In an example system, location information in a buffer tree for the multipart file is changed from indicating the target file in the first constituent to indicating the new file in the second constituent, and a buffer tree associated with the new file in the second constituent is updated to store inode data for the new file in the second constituent.

In an example system, determining whether conditions on the first node indicate a bottleneck condition comprises applying a points-based analysis based on queue latency. In an example system, the points-based analysis is a function of at least raw access count and access percentile. In an example system, the raw access count and the access percentile are maintained in a bloom filter.

In an example system, a private file is generated in the second constituent. Space is allocated for a buffer tree for the private file in the second constituent. A public file is created in the second constituent. The public file comprises the new file in the second constituent. The public file is linked to the buffer tree for the private file. The link is removed from the private file to the buffer tree.

In an example system, the new file in the second constituent comprises a part inode file and the multipart file comprises at least a link to a parts catalog having links to one or more part inode files that each comprise a portion of user data previously stored in the multipart file.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
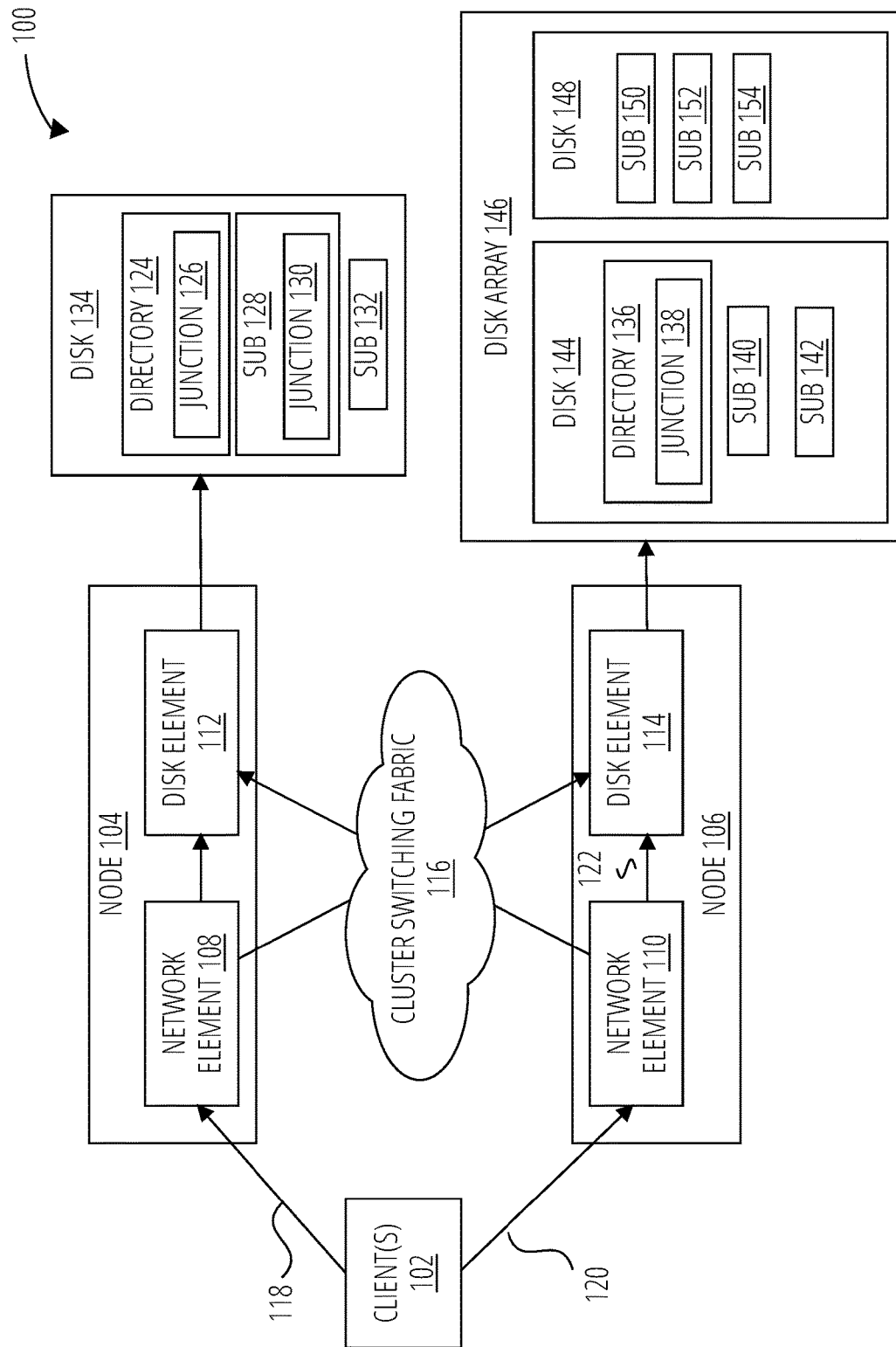
FIG. 1 illustrates one embodiment of block diagram of a plurality of nodes interconnected as a cluster.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

In the description that follows, various example architectures and approaches are provided that can to reduce the risk of bottlenecks from heavy concurrent traffic to a subset of very active files, directories, storage devices, processors, caches, etc. Specific examples are provided in terms of the ONTAP® operating system available from NetApp™, Inc., Sunnyvale, Calif. that can implement a Write Anywhere File Layout (WAFL®) file system; however, other operating systems (with or without WAFL-equivalent functionality) for use in distributed storage systems can also be utilized to provide the functionality described herein. As such, where the term "WAFL" is employed, it should be taken broadly to refer to any storage operating system that is otherwise adaptable to the teachings of this disclosure.

As a preliminary example, if a directory (e.g., Dir A) is being used to ingest data into one or more files in the directory and data write requests may be received by it. These data write requests may be sufficient to cause a bottleneck condition for the directory. As another example, a directory can have multiple files that are receiving a high number of write requests, which causes a bottleneck condition.

In response to detecting a bottleneck condition (or conditions that indicate a bottleneck situation is forming), one or more management mechanisms can initiate a non-disruptive move for one or more files associated with the bottleneck condition. As described in greater detail below, files to be moved can be moved to a single remote volume or multiple files can be distributed across multiple remote volumes.

When the bottleneck condition is resolved, one or more of the files that have been non-disruptively moved in response to the bottleneck condition can be non-disruptively moved back to the original volume (or original directory), or the file(s) can be permanently relocated to the new volumes. The various examples described herein allow the host operating system (e.g., ONTAP®) to employ caching to address bottlenecks; however, other operating systems can also be supported. Thus, the approaches describe are not limited to use in an ONTAP-based environment.

The approaches described herein can be utilized within various architectures (examples of which are provided in the Figures) to accomplish one or more of the following: 1) Bottleneck detection; 2) Load distribution; and 3) Selective one-to-one or one-to-many mapping. Accomplishing one or more of these goals can provide an intelligent approach to managing bottleneck conditions in complex multi-node/multi-member architectures.

Bottleneck detection can include sufficient information about the bottleneck condition to engage responses (e.g., triggering a non-disruptive file move) for one or more files that will potentially benefit from the response. In various examples, the bottleneck mitigation capability is utilized only to address bottlenecks, not under steady state. In some examples, it is engaged and disengaged automatically.

Because a non-disruptive file move expensive, is may only be triggered in a situation where the benefit of the file move is sufficient to overcome the associated costs. Thus, if the overall performance improvements can be achieved by having eliminated a bottleneck through, for example, moving one or more files, the corresponding non-disruptive file move is triggered. Otherwise, the non-disruptive file move is not triggered, and the traffic is managed by other approaches. Conceptually, a key to success is to engage the non-disruptive file move mechanisms only for files that will benefit from it. Various approaches to this evaluation and the subsequent triggering of one or more non-disruptive file moves are described below.

As part of the load distribution approach, a combination of one-to-one and one-to-many techniques can be employed. In an example, if several member volumes are below-average in activity levels all of them can be engaged to some extent in providing destination volumes for files to be moved to help over-active peers. In an example, if a file or directory is heavily accessed, many destination volumes can be utilized; however, if the bottleneck involves a single file receiving heavy write requests only a single destination volume may be sufficient.

In summary, the mechanisms described below intentionally (and very carefully) select particular destination volumes for non-disruptive file moves for each file—taking into account the current load distribution within the cluster and the severity of the bottleneck on the corresponding particular file. The result is that the mechanisms described below are not just trying to offload work from the origin, but instead is intentionally trying to shift load for a specific file from its overloaded host to one or more specifically selected underloaded member volumes.

Further, the approaches described herein may be a better choice for the environment, because the best behavior involves intentionally leveling traffic among members rather than blindly trying to provide a less adaptive approach that will steal computational resources from the origin and bulk up the storage consumption (as it moves not-bottlenecked files unnecessarily) without intentionally offloading work from overburdened members and onto members that have capacity remaining.

FIG. 1 illustrates one embodiment of block diagram of a plurality of nodes interconnected as a cluster. The cluster of nodes illustrated in FIG. 1 can be configured to provide storage services relating to the organization of information on storage devices. Further, the cluster of nodes illustrated in FIG. 1 can be managed utilizing the load distribution and non-disruptive file move strategies described herein.

The nodes of FIG. 1 (e.g., node 104, node 106) include various functional components that cooperate to provide a distributed storage system architecture of cluster 100. To that end, each node is generally organized as a network element (e.g., network element 108 in node 104, network element 110 in node 106) and a disk element (e.g., disk element 112 in node 104, disk element 114 in node 106). In the subsequent figures and description, network element 108 and network element 110 (or comparable components) can also be referred to as N-Blades. Similarly, disk element 112 and disk element 114 (or comparable components) can be referred to as D-Blades. Network elements provide functionality that enables the nodes to connect to client(s) 102 over one or more network connections (e.g., 118, 120), while each disk element connects to one or more storage devices (e.g., disk 134, disk array 146).

In the example of FIG. 1, disk element 112 connects to disk 134 and disk element 114 connection to 146 (which includes disk 144 and 148). Node 104 and node 106 are interconnected by cluster switching fabric 116 which, in an example, may be a Gigabit Ethernet switch. It should be noted that while there is shown an equal number of network and disk elements in cluster 100, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 102 may be general-purpose computers configured to interact with node 104 and node 106 in accordance with a client/server model of information delivery. That is, each client may request the services of a node, and the corresponding node may return the results of the services requested by the client by exchanging packets over one or more network connections (e.g., 118, 120).

Client(s) 102 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 112, disk element 114) are illustratively connected to disks that may be individual disks (e.g., disk 134) or organized into disk arrays (e.g., disk array 146). Alternatively, storage devices other than disks may be utilized, e.g., flash memory, optical storage, solid state devices, etc. As such, the description of disks should be taken as exemplary only. As described below, in reference to FIG. 13, a file system may implement a plurality of flexible volumes on the disks. Flexible volumes may comprise a plurality of directories (e.g., directory 124, directory 136) and a plurality of subdirectories (e.g., sub 128, sub 140, sub 150, sub 152, sub 154). Junctions (e.g., junction 126, junction 130, junction 138) may be located in directories and/or subdirectories. It should be noted that the distribution of directories, subdirectories and junctions shown in FIG. 1 is for illustrative purposes. As such, the description of the directory structure relating to subdirectories and/or junctions should be taken as exemplary only.

Figure 2:
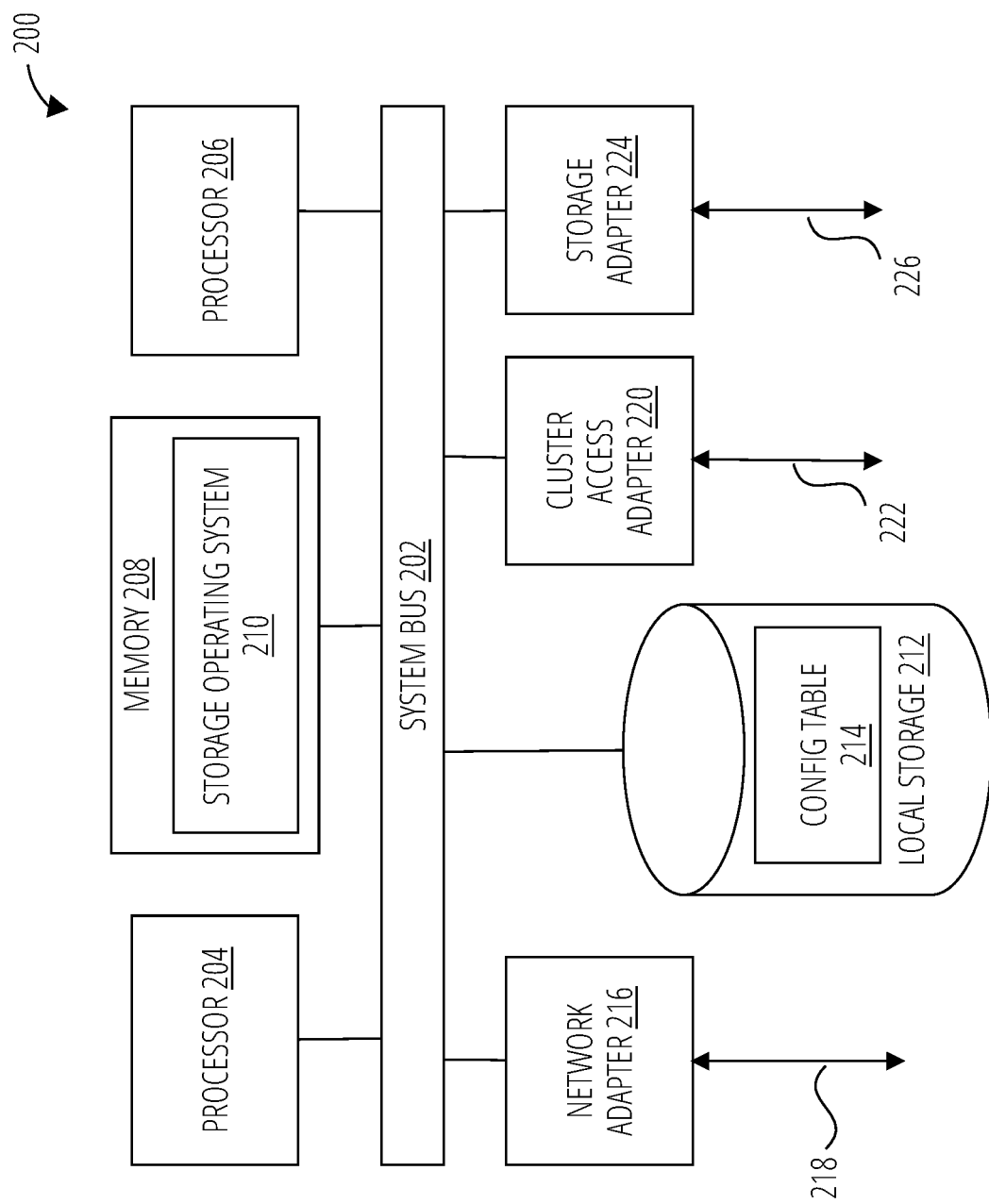
FIG. 2 illustrates one embodiment of a block diagram of a node.

FIG. 2 illustrates one embodiment of a block diagram of a node. Node 200 can be, for example, node 104 or node 106 as discussed in FIG. 1. In the example of FIG. 2, node 200 includes processor 204 and processor 206, memory 208, network adapter 216, cluster access adapter 220, storage adapter 224 and local storage 212 interconnected by 202. In an example, local storage 212 can be one or more storage devices, such as disks, utilized by the node to locally store configuration information (e.g., in config table 214).

Cluster access adapter 220 provides a plurality of ports adapted to couple node 200 to other nodes (not illustrated in FIG. 2) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 220 is utilized by the network element (e.g., network element 108, network element 110) and disk element (e.g., disk element 112, disk element 114) for communicating with other network elements and disk elements in the cluster.

In the example of FIG. 2, node 200 is illustratively embodied as a dual processor storage system executing storage operating system 210 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 200 may alternatively comprise a single or more than two processor system. In an example, processor 204 executes the functions of the network element on the node, while processor 206 executes the functions of the disk element.

In an example, memory 208 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 210, portions of which is typically resident in memory and executed by the processing elements, functionally organizes node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 210 can be the Data ONTAP® operating system. However, it is expressly contemplated that any appropriate storage operating system may be enhanced for use in accordance with the inventive principles described herein. In an example, the ONTAP operating system can provide (or control the functionality of) bottleneck mitigation and non-disruptive file move functionality.

In an example, network adapter 216 provides a plurality of ports adapted to couple node 200 to one or more clients (e.g., client(s) 102) over one or more connections 218, which can be point-to-point links, wide area networks, virtual private networks implemented over a public network (Internet) or a shared local area network. Network adapter 216 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

In an example, to facilitate access to disks, storage operating system 210 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage adapter 224 cooperates with storage operating system 210 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 222. Storage adapter 224 provides a plurality of ports having input/output (I/O) interface circuitry that couples to the disks over an I/O interconnect arrangement, such as a high-performance, CF link topology.

Figure 3:
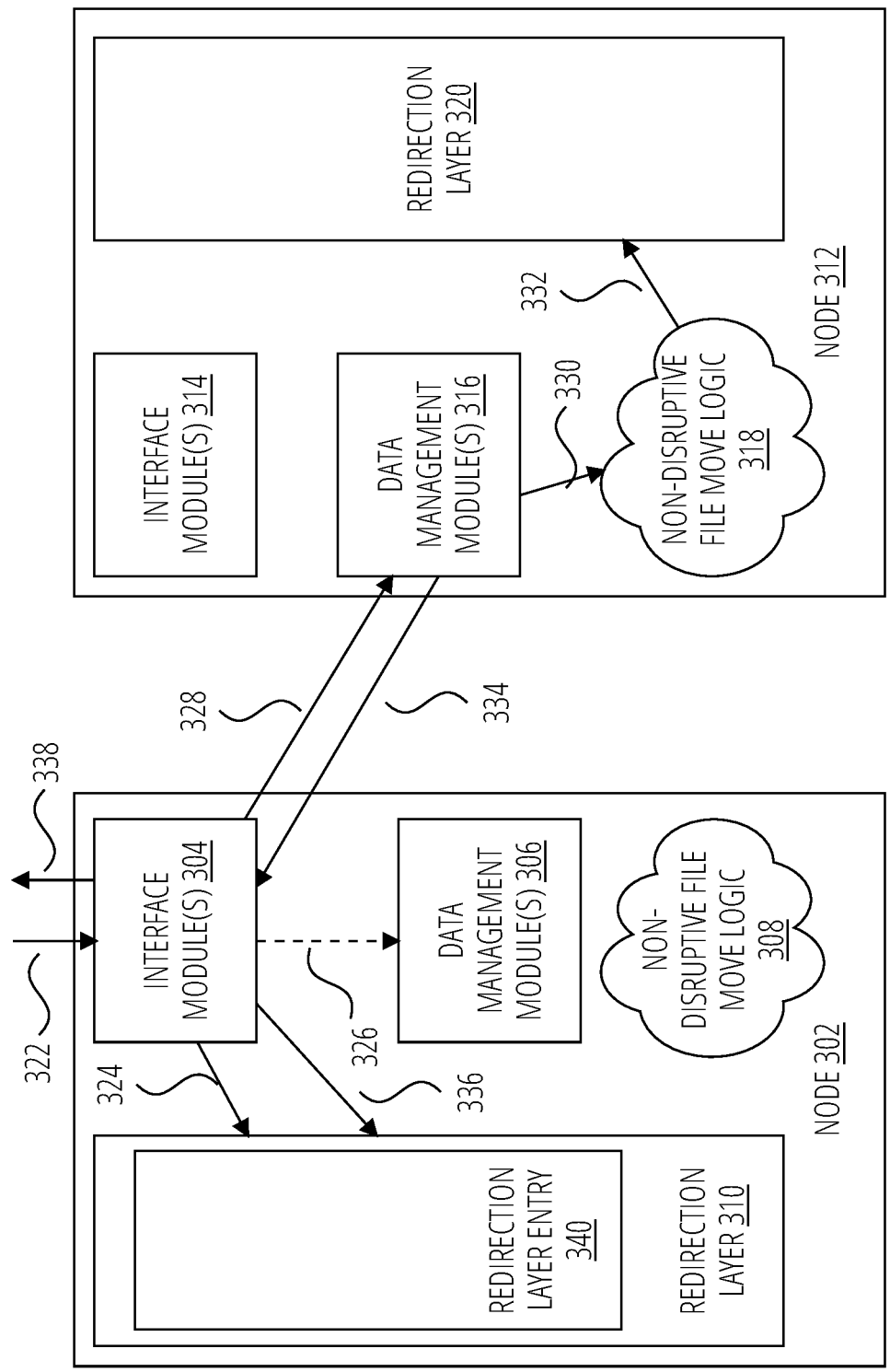
FIG. 3 is an example block diagram of components to provide load sharing and non-disruptive file moves.

FIG. 3 is an example block diagram of components to provide load sharing and non-disruptive file moves. The example of FIG. 3 illustrates two nodes (e.g., node 302, node 312); however, any number of nodes can be supported to provide the write load distribution and non-disruptive file move functionality described herein. An example of non-disruptive file move functionality and corresponding architectures are described in co-pending U.S. patent application Ser. No. 18/305,927 filed Apr. 24, 2023, and entitled "Non-Disruptive File Movement Within a Distributed Storage System", which is incorporated by reference herein.

In general, the interface module(s) (e.g., interface module(s) 304, interface module(s) 314) of a node handle receiving requests from external devices (e.g., other nodes) and provides some initial processing of the request, which will be described in greater detail below. The data management module(s) (e.g., data management module(s) 306, data management module(s) 316) operate on information and data from the interface module(s), redirection layers (e.g., redirection layer 310, redirection layer 320) and non-disruptive file move logic (e.g., non-disruptive file move logic 308, non-disruptive file move logic 318) to provide the bottleneck detection and corresponding non-disruptive file move techniques described herein.

As a simple example, node 302 can receive inbound request 322 (e.g., a write request) through interface module(s) 304. Interface module(s) 304 can perform some translation, if necessary, and generate an initial routing based on, for example, an inbound file handle and/or other information. In an example, interface module(s) 304 can receive inbound request 322 and determine a member volume, or node, to service the request. In an example where no redirection layer entry corresponding to inbound request 322 exists, the request can be forwarded (e.g., request 326) to data management module(s) 306 to be serviced by the local node (e.g., node 302).

Figure 12:
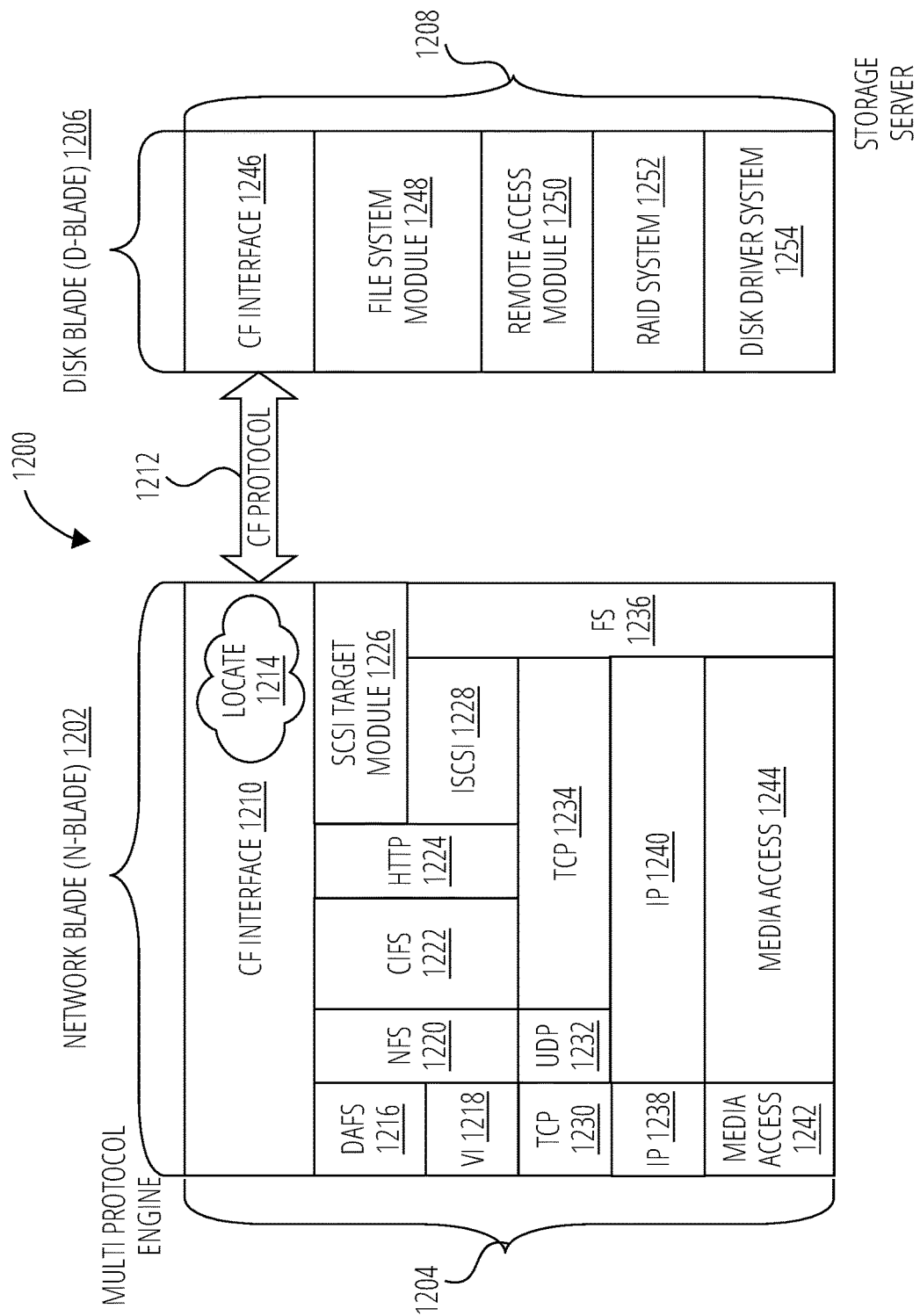
FIG. 12 illustrates one embodiment of a block diagram of a storage operating system.

Interface module(s) 304 and interface module(s) 314 can also be referred to as N-Blades (e.g., network blade (N-Blade) 1202 as illustrated in FIG. 12), which can be part of a multi-protocol engine (e.g., multi-protocol engine 1204) described in detail in FIG. 12.

In an example, before sending the request from interface module(s) 304 to the selected member volume (e.g., data management module(s) 306), redirection layer 310 is consulted (e.g., via advisory cache check 324) to determine if there is an "advisory" in place for handling the file for load distribution purposes.

Data management module(s) 316 and data management module(s) 306 can also be referred to as D-Blades (e.g., disk blade (D-Blade) 1206 as illustrated in FIG. 12), which can also be part of the multi-protocol engine described in FIG. 12.

Interface module(s) 304 sends the request (e.g., request 328) to data management module(s) 316 based on the redirection layer entry 340, if it corresponds to inbound request 322, or based on another initial routing decision. For example, in a complex system having more than two nodes, the initial routing decision my indicate a node other than node 302 or node 312 (which is not illustrated in FIG. 3).

In an example, in response to receiving request 328, data management module(s) 316 can detect hot spots to determine whether the file being accessed for request 328 is becoming problematic by accessing non-disruptive file move logic 318. In general, non-disruptive file move logic 318 monitors the components of node 312 to determine if a bottleneck is developing or currently exists. Operation of non-disruptive file move logic 318 (and similarly, non-disruptive file move logic 308) is described in greater detail below. While non-disruptive file move logic 318 is illustrated as separate from data management module(s) 316, in some embodiments, non-disruptive file move logic 318 may be integrated within data management module(s) 316.

If non-disruptive file move logic 318 determines a bottleneck exists and/or is likely to happen, non-disruptive file move logic 318 will update redirection layer 320 for the corresponding file(s). Information stored in redirection layer 320 can be, for example, potential alternate nodes to service the request, conditions/parameters corresponding to the bottleneck, updates to be applied to redirection layer 310 for the subject file through an example process described below.

Data management module(s) 316 service request 328 using resources of node 312 and generates response 334 to be transmitted to interface module(s) 304. In an example, response 334 can include some or all of the advisory information that is stored in redirection layer 320. This advisory information from response 334 can be used to update redirection layer 310. As illustrated in FIG. 3, interface module(s) 304 can update redirection layer 310 via advisory cache update 336.

In an example, the load distribution logic can build and maintain two models: one inactive model that is being built and one that has been built and is in active use. In an example, building a new model occurs over a fixed period of time: a window during which activity is measured and the model's contents are populated. In an example, the duration of the measurement window is fixed by configuration (e.g., ~30 sec to 1 min in time). As each window comes to an end, the now-completed model becomes active, and the older model it replaces is reset to inactive state and is used to begin building a fresh new model during the next window. In this way the non-disruptive file move logic is constantly building a fresh model for the future, while acting on the prior model that was recently completed (e.g., within the last minute). Conceptually, the non-disruptive file move logic model retains two categories of information: activity levels for each member volume and a counting bloom filter representing file activity. These categories of information and the use thereof is described in greater detail below.

In an example, if the local member volume has an activity level that's not above some high-water mark (e.g., ~10% above the average), new cache advisories entries are not generated. Traffic that is off-loaded will be sent to a different member volume, so if the local member volume is presently better able to handle extra traffic than peer volumes, the traffic remains with the local member volume. In an example, there may also be some hysteresis involved in that a bottleneck may be forming for which an advisory is issued, which causes the workload to decrease. In an example, if the local member volume activity level is high (e.g., above average) then new advisories can be issued, while if the activity level of the local member volume is not yet low (e.g., below average) advisories that are already in place are refreshed.

Using these criteria, a file that is part of a bottleneck that is impacting the local volume ability to serve traffic can be identified and at least a portion of the traffic can be offloaded to another volume via, for example, a non-disruptive file move. In an example, a "points" based approach is used to decide how aggressively to encourage caching. In an example, the "points" value corresponds to the local volume's activity level beyond the average, multiplied by the file's particular access percentile. For example, an operation is received against a file, and on looking up the file handle against the current counting bloom filter model, it has a raw access count of 60 and an access percentile of 75% (because the peak bucket count in the model's counting bloom filter was 80). If the local member volume activity level is 3.8 and the local member volume average activity level is 2.3, then 3.8-2.3=1.5 difference and multiply it by the 75% access percentile, to arrive at 1.125 "points."

Returning to the bottlenecked member volume above, the local member volume has an activity level of 3.8 against the average activity level of 2.3 ms. The units in the example are ms of queuing latency; however, any other latency measure could be used. In an example, if this bottleneck is the result of exactly one file that is being flooded with requests (e.g., it is responsible for 10,000 raw access count out of the most recent 12,500 total requests) a request to service that file handle and look it up in the active model counting bloom filter. Continuing the example, the counting bloom filter indicates that the file has a raw access count of 10,000 and its access percentile is 80% (10 k/12.5 k), which results in (3.8−2.3=1.5)*80% or 1.2 points for the file. More generally, any other metric can be used.

If the bottleneck is instead the result of 10 different files, all equally busy but collectively producing the same 10,000 actual raw accesses over the previous window out of 12,500 total requests, so the overall load on the volume is the same. When a request from any one of these 10 files received and a look up by the file handle the to the current model bloom filter, it has a raw access count of 1,000 and its access percentile is 1000/12,500=8%. Thus, each file is allocated (3.8−2.3=1.5)*8%=0.12 points.

Conceptually, each below-average-activity-level member volume can absorb a number of points equal to the average activity level minus its own activity level. Thus, once the points have been computed for a particular file, an evaluation can be made to determine which available member volume can receive the file as the result of a non-disruptive file move.

In the example where the single member volume was idle, that idle member volume will be able to absorb as many points as the local active member volume may be able to charge. Therefore, in this case, as soon as that member volume is identified, the idle member volume will be able to accommodate all of the traffic to be offloaded (and the candidates list will be just the idle member volume) regardless of how many points are assigned for caching the file. In an example where all other volumes are equally busy and each is only slightly below the average activity level, all of the other member volumes might be employed as destination volumes before finding enough entries to accommodate all of the computed points.

Figure 4:
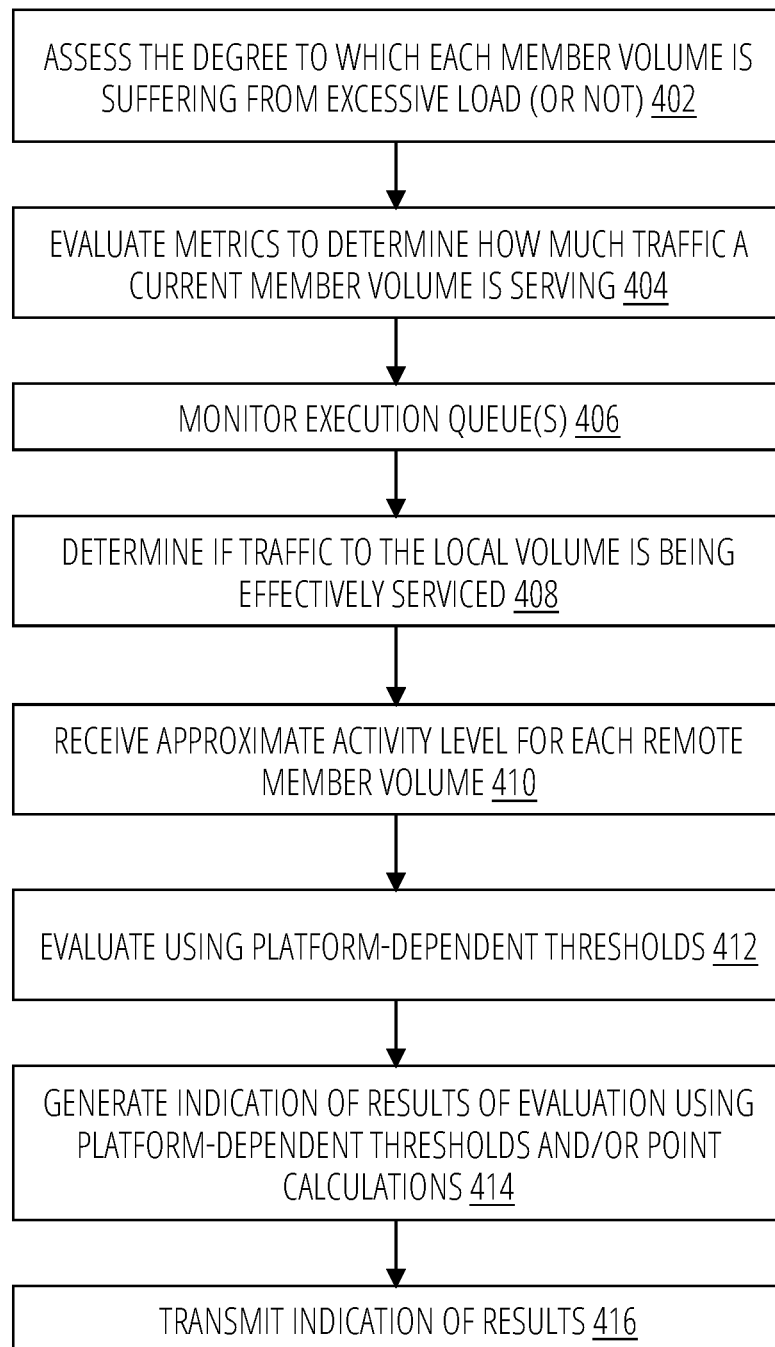
FIG. 4 is a flow diagram corresponding to an example approach to measuring activity levels that can be utilized for managing load sharing and non-disruptive file moves.

FIG. 4 is a flow diagram corresponding to an example approach to measuring activity levels that can be utilized for managing load sharing and non-disruptive file moves. The first task of the non-disruptive file move logic generated model is to assess the degree to which each member volume is suffering from excessive load (or not), block 402. Conceptually, the point of load sharing is, in essence, to direct some traffic away from member volumes that are over-loaded and towards member volumes that are under-loaded. Therefore, in an example, the load distribution logic begins by classifying the load levels on the various volumes, in order to discriminate between volumes that need to yield traffic and those which can absorb more. The numeric value of this activity level—whatever its source or units—is useful but not necessarily particularly crucial: a high value represents a volume that is (relatively) busy and a low value represents a volume that is (relatively) not, such that volumes with high values should reduce their traffic and volumes with low values are in comparison able to tolerate more traffic.

There are many available metrics that can be used to determine how much traffic a member volume has been serving, block 404. However, it should be noted that various operations require different amount of effort on the volume's behalf. In an example, a wide variety of metrics can be considered and hashed together to judge whether volume A or volume B is more "busy." However, the more complex the computation the more likely it is that some other variable is missed and/or misconfiguring some weighting. So, in the examples described, a volume's activity level can be evaluated by observing a direct proxy value: message queuing latency. In alternate examples, other proxy values or combinations of values can be used. The message queueing latency is the amount of time that elapses between when a message is enqueued for execution, and the time when that message is dequeued and begins executing. In a "healthy" volume this value is close to zero, but when traffic is becoming backlogged, the queue latency can become quite large.

A volume can have many available execution queues. In an example, while building its next model, the load distribution logic monitors the maximum queue latency that it observes for any message on any queue that is serviced on behalf of a particular member volume, block 406. In an example, at the end of the observation window, this maximum observed value is the metric that will be considered the representative activity level for that volume. In an example, if one queue that services the volume develops a problem, the whole volume will be considered to have a problem.

Determine whether or not traffic to the volume is being effectively serviced in a reasonable period of time, block 408. If it is not, then traffic for this volume is probably better served by some other volume instead.

In an example, data management module(s) can only directly measure the activity levels for member volumes of its own node, because the data management module(s) will only receive traffic for that subset of member volumes. In an example, to build a picture of collective activity levels on all member volumes, an approximate activity level for each member can be exchanged between member volumes, block 410. In an example, this information is exchanged continuously at a pre-selected (e.g., ~1 sec., ~3 sec.) cadence. Additional information (e.g., recent operation rates, current free space, ingestion information) can also be exchanged using the same infrastructure.

These exchanged activity levels are the result of short (~5 sec) sliding-window views of recently observed queuing latencies on each member: the highest queuing latency observed in the window is transmitted as representative, and as the load distribution logic builds a model based on the highest value received for each remote member during its observation window. In this way, each model will attain a pessimistic view of the queuing latency for all members in the group, depicting realistically which volumes appear to be struggling to serve traffic and which are not. However, exchanged activity levels can take many other forms as well.

Because the queuing latency is a directly meaningful quantity itself (e.g., as opposed to a weighted hash of a series of different metrics), platform-dependent thresholds can be applied to evaluate the latency, block 412. For example, values under X ms could be considered healthy, while values over Y ms can be considered problematic. And an average of the observed activity levels for all member volumes, which value will be stored with the model and which will feature prominently in the subsequent steps.

The load distribution logic (or other platform components) generates an indication of results of the evaluation process described above, block 414. In an example, the points value corresponds to the local volume's activity level beyond the average, multiplied by the file's particular access percentile. Alternate approaches can be utilized to determine a points value to be applied.

In an example, there can be discrete levels of volume activity at which advisories are generated, for example, at a minimum threshold the issuing volume must have an above-average activity level divided into multiple (e.g., three, six, eight) regions (e.g., a significantly higher-than-average level is required to issue new advisories, while an activity level that's below some minimum value might cause the node to actively revoke some or all of its existing advisories to try to draw traffic back to itself).

In an example, if the load on a member volume continues to be higher than average even after issuing redirection layer entries, the node can apply a slowly growing cumulative "bonus" to the point computations to increase the rates of non-disruptive file moves until the load begins to level out. In an example, a bonus could also be used to decrease the thresholds at which non-disruptive file moves are employed.

In a more complex example, the cumulative component can be treated as the integral component in a Proportional-integral-derivative (PID) controller: basic point assignment is the Proportional component, this cumulative error represents Integral. Therefore, the Derivative component could be based on if the load imbalance is improving, then the rate of points being given out could be dampened to help mitigate oscillation.

The indication (e.g., a point total) is then transmitted to one or more components (e.g., redirection layer, remote node, redirection layer on a remote node), block 416.

Some of the examples described above are described as using a fixed cadence for the timing window (e.g., accumulate data into the bloom filter for 30 seconds, at which point it becomes promoted to being active). In an example, this cutover happens when either of two things occur: either the 30-second population time concludes, or the number of nonzero buckets within the bloom filter reaches some percentile (e.g., 15%, 20%, 25%). Thus, if the bloom filter becomes populated even to some relatively low threshold, an early cutover may occur to avoid the risk of false positives. The result is that, under very heavy activity levels, the operation accumulation window becomes shorter and shorter, but the answers coming back from the table remain sufficiently accurate.

Figure 5:
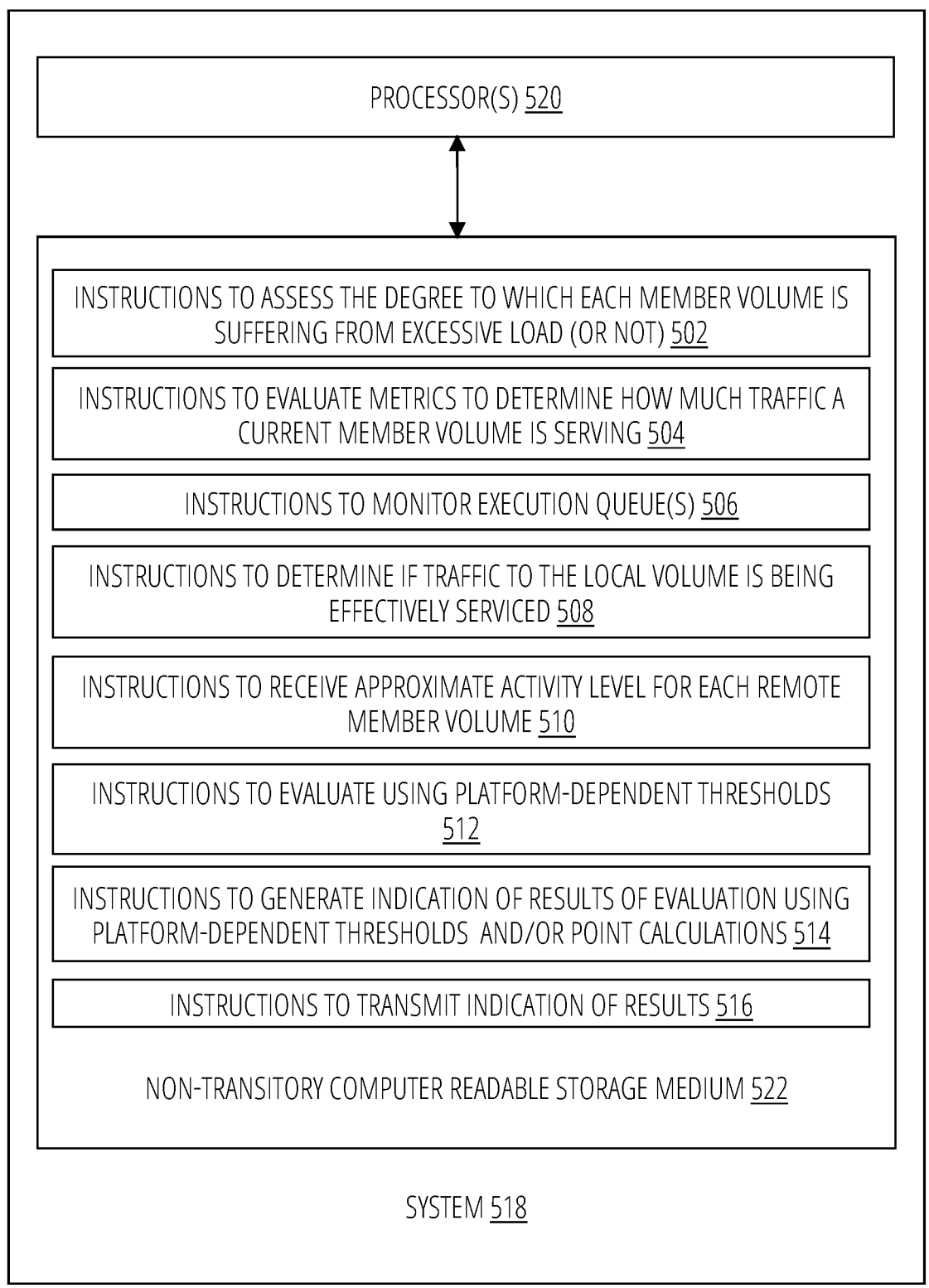
FIG. 5 illustrates an example system to provide an approach to measuring activity levels that can be utilized for managing load sharing and non-disruptive file moves.

FIG. 5 illustrates an example system to provide an approach to measuring activity levels that can be utilized for managing load sharing and non-disruptive file moves. In an example, system 518 can include processor(s) 520 and non-transitory computer readable storage medium 522. In an example, processor(s) 520 and non-transitory computer readable storage medium 522 can be part of a node having a storage operating system that can provide some or all of the functionality of the ONTAP software as mentioned above.

Non-transitory computer readable storage medium 522 may store instructions 502, 504, 506, 508, 510, 512, 514 and 516 that, when executed by processor(s) 520, cause processor(s) 520 to perform various functions. Examples of processor(s) 520 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 522 include tangible media such as random-access memory (RAM), read-only memory (ROM), electrically erasable programmable read-only memory (EEPROM), flash memory, a hard disk drive, etc.

Instructions 502 cause processor(s) 520 to assess the degree to which each member volume is suffering from excessive load (or not). As discussed above, the point of load sharing is to direct traffic away from member volumes that are over-loaded and towards member volumes that are under-loaded. In an example, instructions 502 cause processor(s) 520 to classify load levels on the various volumes in order to discriminate between volumes that need to yield traffic and those which can absorb more. Various classifications can be used, for example, high-load/low-load, high-load/medium-load/low-load, extreme-load/high-load/medium-high-load/medium-low-load/low-load/no-load, etc.

Instructions 504 cause processor(s) 520 to collect, calculate and/or evaluate various metrics that can be used to determine how much traffic a member volume has been serving. In an example, a wide variety of metrics can be considered and hashed together. In the examples described, a volume's activity level can be evaluated by observing a direct proxy value: message queuing latency. In alternate examples, other proxy values or combinations of values can be used. The message queueing latency is the amount of time that elapses between when a message is enqueued for execution, and the time when that message is dequeued and begins executing. In an example, the greater the latency the greater the corresponding load. Various thresholds can be used to achieve classifications using the categories described above.

Instructions 506 cause processor(s) 520 to monitor the queue latency of one or more execution queues for any message on any queue that is serviced on behalf of a particular member volume. In an example, at the end of the observation window, this maximum observed value is the metric that will be considered the representative activity level for that volume. In an example, if one queue that services the member volume develops a problem, the whole volume will be considered to have a problem. In other configurations, individual queues may be handled independently rather than as an indication of the member volume as a whole.

Instructions 508 cause processor(s) 520 to determine if traffic to the member volume is being effectively serviced based on the queue latency information. If a volume is slowing because the volume is the victim of some other process that is consuming processor resources, memory, network, or disk bandwidth, the queue latency metric will increase. Similarly, if the volume is the source of the congestion problem and cannot keep up with its own traffic, the queue latency will indicate a problem. As discussed above, the cause of the congestion it is not important when using the redirection layer approach described herein. Thus, the network traffic rates, and disk throughput rates (and similar metrics) do not need to be measured if there can be a determination of whether or not traffic to the volume is being effectively serviced in a reasonable period of time based on queue latency.

Instructions 510 cause processor(s) 520 to build a picture of collective activity levels on all member volumes, an approximate activity level for each member can be exchanged between member volumes. Because data management module(s) only directly measure the activity levels for member volumes of its own node, the data management module(s) will only receive traffic for that subset of member volumes and this information is exchanged continuously at a pre-selected (e.g., ~1 sec., ~3 sec.) cadence. Additional information (e.g., recent operation rates, current free space, ingestion information) can also be exchanged using the same infrastructure. In an example, the highest queuing latency observed in the window is transmitted as representative, and a model is built based on the highest value received for each remote member during its observation window.

Instructions 512 cause processor(s) 520 to apply platform-dependent thresholds can be applied to evaluate the latency. For example, values under X ms could be considered healthy, while values over Y ms can be considered problematic for a first volume, and values under (x+10) ms could be considered healthy, while values over 2Y ms can be considered problematic for a second volume.

Instructions 514 cause processor(s) 520 to generates an indication of results of the evaluation process described above. The indication of the results can be, for example, the measured latency values, the difference between the latency values and the thresholds, information to start a redirection layer entry and/or information to be stored in redirection layer entry. Instructions 516 cause processor(s) 520 to cause the indication to be transmitted to one or more components.

Figure 6:
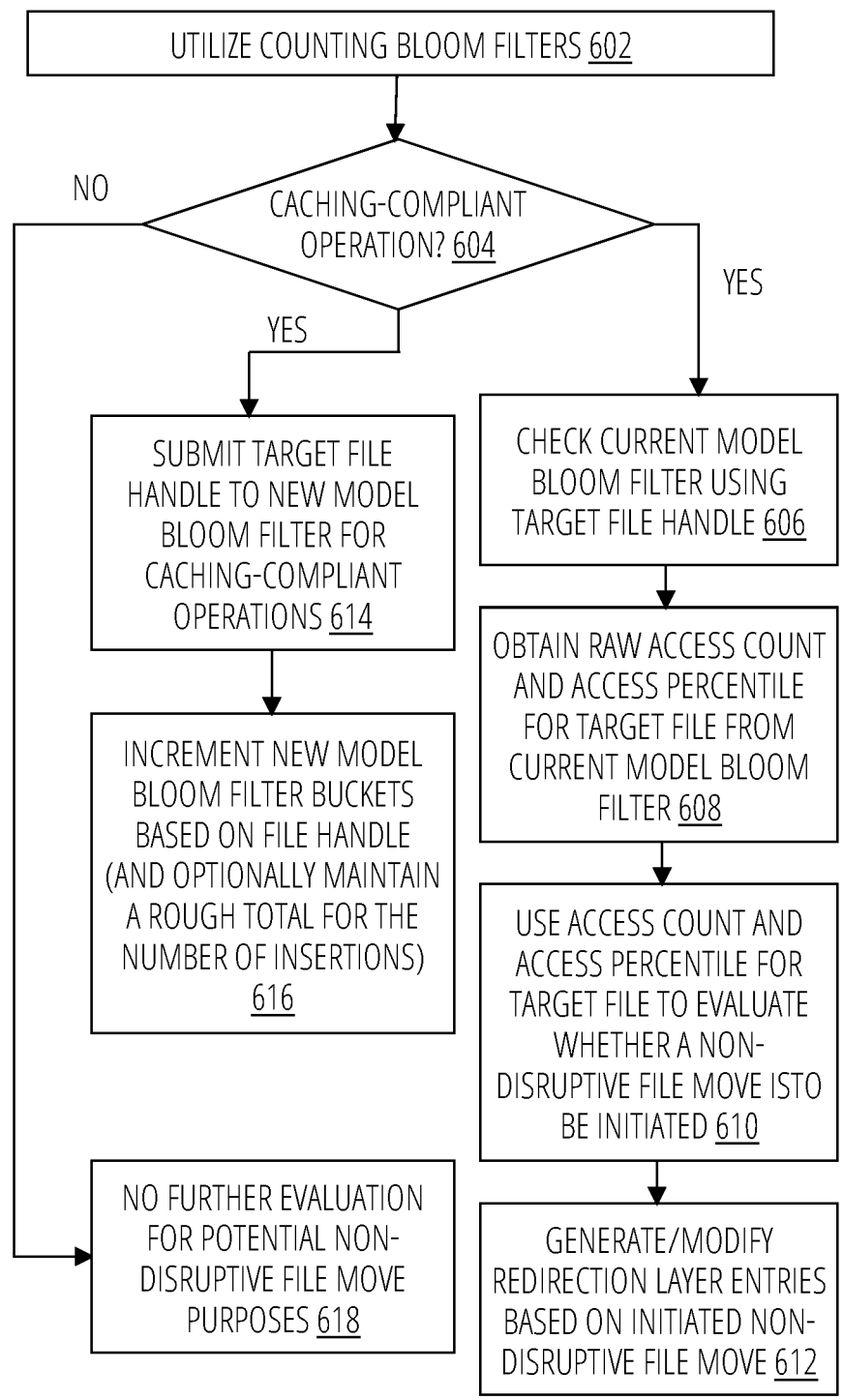
FIG. 6 is a flow diagram corresponding to an example approach to identifying which file(s) are contributing to observed traffic bottleneck conditions.

FIG. 6 is a flow diagram corresponding to an example approach to identifying which file(s) are contributing to observed traffic bottleneck conditions. In an example, the approach of FIG. 6 is performed in response to the indication generated (and possibly transmitted) as described with respect to FIG. 4.

In an example, the load distribution logic implements a counting bloom filter, block 602. In an example, the bloom filter is a typical bloom filter (e.g., k=4 with a collection of four distinct hash algorithms), except that every cell in the filter is an unsigned integer rather than a single bit. In other implementations, different bloom filter configuration can be utilized.

The target operation is evaluated to determine whether it is a caching-compliant operation, decision block 604. In an example, a caching-compliant operation is one that meets the following three criteria: 1) the operation is running against a file or directory that exists on the local volume (i.e., is not a caching operation); 2) the operation is one for which the data management module(s) will later consult the redirection layer; and 3) the primary file involved has an initiation time that is behind the wall clock time (to avoid interfering with intermittent RW/RO traffic). In alternate configurations, additional and/or different criteria can be used for evaluating a caching-compliant operation.

As illustrated in FIG. 6, while building a new model each file handle encountered (within a caching-eligible operation) is inserted into the new model's bloom filter (e.g., block 614, block 616). Similarly, while serving each file operation, the cache-eligible file handle is passed to the active model bloom filter (e.g., block 606, block 608, block 610, block 612). Thus, both branches are traversed for each file handle corresponding to a caching-eligible operation. If the target operation is not a caching-compliant operation, decision block 604, no further evaluation is performed for advisory cache purposes, block 618.

The bloom filter utilized by the data management module(s) can quickly become quite large (e.g., 100,000+ buckets, each of which holds a 16-bit integer), and with two models in use at any time, the memory requirement can become large. However, these boom filters are global to the node and are not specific to any particular volume, so the memory is charged only once against the whole filer, and not repeatedly for each discrete volume. In an example, the capacity of the bloom filter can be chosen based on the likely number of unique file handles that may be encountered during a relevant (e.g., 15-second, 30-second, 45-second, 60-second) window for building a new model. The 100,000-bucket example is just a simple estimate to be used as an example and may be wrong in either direction. Larger filters are more accurate but are more expensive to manage.

In an example, an epoch value can be used on each bucket to avoid some computational expense in exchange for more memory usage and more computation on each insertion and lookup. In the approach described, the bloom filter is frequently populated with data and then, a relatively short time (e.g., 30 seconds later), the bloom filter is wiped back to empty and populated it again. Clearing a filter would normally require filling the whole thing with zeroes, which is an expensive operation. Using an epoch value amortization of that cost. Conceptually, the filter is "wiped" by incrementing a global epoch value (the "real version") and there is an epoch value associated with each bucket in the filter as well. If a bucket's epoch value does not match the global value, then that bucket's epoch value is inferred the value of zero the bucket can be added to. However, if the epoch mismatches, then the is bucket back to zero and its epoch value is set to match the global value. This is one approach to avoiding using a zero-fill across the whole (large) memory structure frequently (e.g., every 30 seconds).

A bloom filter is, by its very nature, inaccurate. The canonical implementation offers a guarantee of successful lookup after insert, but it does not offer a guarantee of the reverse. That is, the bloom filter can present a false positive, where a lookup of a not-truly-inserted item reports success. The false positive rate is a function of table size, insertion count, and hash function efficacy. And to achieve even this guarantee in a parallel-execution environment, the implementation typically requires locks or other atomic test-and-change mechanisms to prevent the various entities from accidentally overwriting information that their peers are in the process of changing concurrently.

However, these locks are not necessary if the approach being utilized is capable of functioning properly with the inaccuracy in the table's contents in exchange for greater performance. In an example, the techniques described to monitor bottleneck conditions meets this criterion. And in exchange for this inaccuracy, locking can be omitted as the bloom filter is updated or consulted.

In an example, as each caching-compliant operation runs, that operation's target file handle is submitted to the new model bloom filter, block 614. Continuing the k=4 example, above, the handle is hashed four ways, mapping to up to four different "buckets" within the filter. Other bloom filter configurations can also be utilized (e.g., k=2, k=8).

Being a counting bloom filter, each bucket value is incremented as it is encountered, block 616. In an example, a rough total for the number of insertions is also maintained, also block 616. In an example, non-disruptive file moves and corresponding redirection layer entries are only generated for caching-compliant operations, so the bloom filter is only used for caching-compliant operations.

In an example, in addition to use of the new model bloom filter as described, the current model bloom filter is also utilized for each file handle corresponding to a caching-eligible operation. The current model bloom filter is checked using the target file handle, block 606.

Use of the counting bloom filter as described provides at least two advantages. First, the approach is relatively fast and has a fixed memory cost. Only a limited amount of computation is required for each access and there is no corresponding memory allocation or locking. This makes the mechanism suitable for always-on behavior. Second, the mechanism can indicate whether a particular file handle was inserted previously and can give a good estimate of how many times it was previously inserted. Also, the mechanism can provide a good estimate of what percentage of the overall number of the insertions in the table were performed on behalf of the subject file/directory.

In an example, the access to the current model bloom filter provides a guess at the raw frequency with which this particular file was accessed during that model's building window (referred to as the file's "raw access count"), and a guess at percentile with which this individual file is itself the peak bottleneck (referred to as the file's "access percentile"), block 608.

In the k=4 example, during any lookup of a file handle against the current model filter, the requested file handle is again hashed four ways which yields up to four different buckets; the lowest value in any of those buckets is returned and represents the probable number of times that this specific file handle was submitted to the table.

The raw access count information and access percentile information are evaluated to determine whether a redirection layer entry for the file handle should be generated (or updated), block 608. In an example, if the file handle's count is 60 and the total number of insertions is 80, then this file could be considered to be 60/80=75% towards being the bottleneck. Other parameters (or combinations of parameters) can be utilized to determine when a bottleneck condition is starting (or has occurred) and a non-disruptive file move can be triggered with a corresponding redirection layer entry for the operation, block 610.

In an example, If the raw access count is below some minimum threshold, it is not cached. The raw access count represents a rough count of accesses to the corresponding file during a specified time window (e.g., one minute worth of traffic). If some relatively large N-operations-per-minute are not observed on the file, a non-disruptive file move is likely not going to be helpful.

Some of the examples described above are described as using a fixed cadence for the timing window (e.g., accumulate data into the bloom filter for 30 seconds, at which point it becomes promoted to being active). In an example, this cutover happens when either of two things occur: either the 30-second population time concludes, or the number of nonzero buckets within the bloom filter reaches some percentile (e.g., 15%, 20%, 25%). Thus, if the bloom filter becomes populated even to some relatively low threshold, an early cutover may occur to avoid the risk of false positives. The result is that, under very heavy activity levels, the operation accumulation window becomes shorter and shorter, but the answers coming back from the table remain sufficiently accurate.

Figure 7:
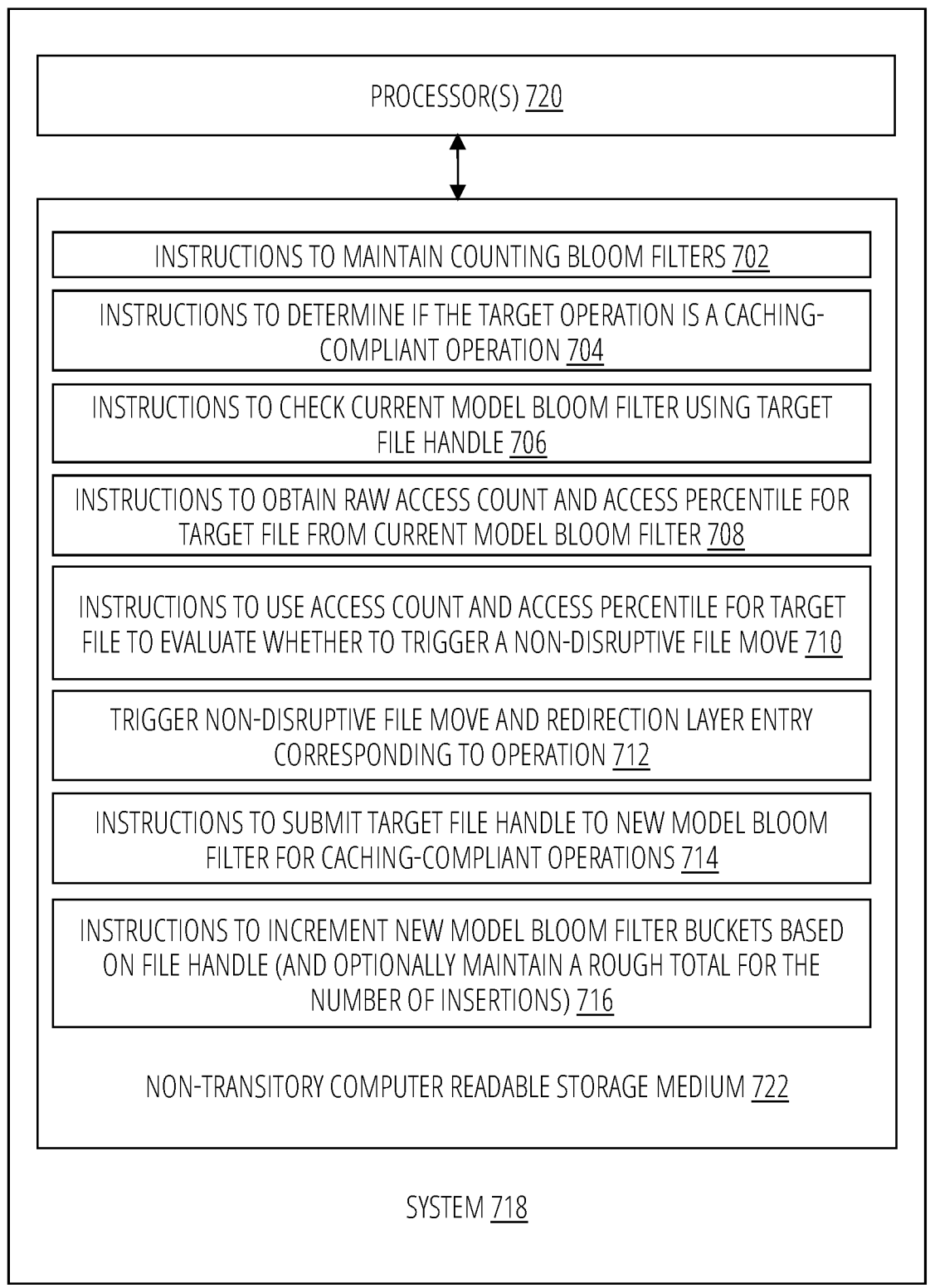
FIG. 7 illustrates an example system to provide an approach to identifying which file(s) are contributing to observed traffic bottlenecks that can be utilized for managing load sharing and non-disruptive file moves.

FIG. 7 illustrates an example system to provide an approach to identifying which file(s) are contributing to observed traffic bottlenecks that can be utilized for managing load sharing and non-disruptive file moves. In an example, system 718 can include processor(s) 720 and non-transitory computer readable storage medium 722. In an example, processor(s) 720 and non-transitory computer readable storage medium 722 can be part of a node having a storage operating system that can provide some or all of the functionality of the ONTAP software as mentioned above.

Non-transitory computer readable storage medium 722 may store instructions 702, 704, 706, 708, 710, 714 and 716 that, when executed by processor(s) 720, cause processor(s) 720 to perform various functions. Examples of processor(s) 720 may include a microcontroller, a microcontroller, a microprocessor, a CPU, a GPU, a DPU, an ASIC, a FPGA, a SoC, etc. Examples of non-transitory computer readable storage medium 722 include tangible media such as RAM, ROM, EEPROM, flash memory, a hard disk drive, etc.

In an example, the capacity of the bloom filter can be chosen based on the likely number of unique file handles that may be encountered during a relevant (e.g., 15-second, 30-second, 45-second, 60-second) window for building a new model. The 100,000-bucket example is just a simple estimate to be used as an example. An epoch value can be used on each bucket to avoid some computational expense in exchange for more memory usage and more computation on each insertion and lookup.

Instructions 702 cause processor(s) 720 to implement a counting bloom filter. In an example, the bloom filter is a typical bloom filter (e.g., k=4 with a collection of four distinct hash algorithms). In an example, except that each cell in the filter is an unsigned integer rather than a single bit. In other implementations, different bloom filter configuration can be utilized.

Instructions 704 cause processor(s) 720 to evaluate each read request to determine whether it includes one or more caching-compliant operations. In an example, a caching-compliant operation is one that meets the criteria described above. In alternate configurations, additional and/or different criteria can be used for evaluating a caching-compliant operation.

Instructions 706 cause processor(s) 720 to check the current model bloom filter using the target file handle. In an example, in addition to use of the current model bloom filter as described, the new model bloom filter is also utilized for each file handle corresponding to a caching-eligible operation.

Instructions 708 cause processor(s) 720 to use the bloom filter to guess at the raw frequency with which this particular file was accessed during that model's building window (referred to as the file's "raw access count"), and a guess at percentile with which this individual file is itself the peak bottleneck (referred to as the file's "access percentile"), block 608.

Instructions 710 cause processor(s) 720 to use the raw access count information and access percentile information to determine whether to trigger a non-disruptive file move. In an example, if the file handle's count is 60 and the total number of insertions is 80, then this file could be considered to be 50/90=55% towards being the bottleneck.

Instructions 712 cause processor(s) 720 generate trigger the non-disruptive file move for the corresponding operation. Other parameters (or combinations of parameters) can be utilized to determine when a bottleneck condition is starting (or has occurred).

Instructions 714 cause processor(s) 720 to submit each operation's target file handle to the new model bloom filter. Continuing the k=4 example, above, the handle is hashed four ways, mapping to up to four different "buckets" within the filter. Other bloom filter configurations can also be utilized (e.g., k=2, k=8). In the k=4 example, during any lookup of a file handle against the current model filter, the requested file handle is again hashed four ways which yields up to four different buckets; the lowest value in any of those buckets is returned and represents the probable number of times that this specific file handle was submitted to the table.

Instructions 716 cause processor(s) 720 to increment each bucket value in the counting bloom filter. In an example, a rough total for the number of insertions is also maintained.

Figure 8:
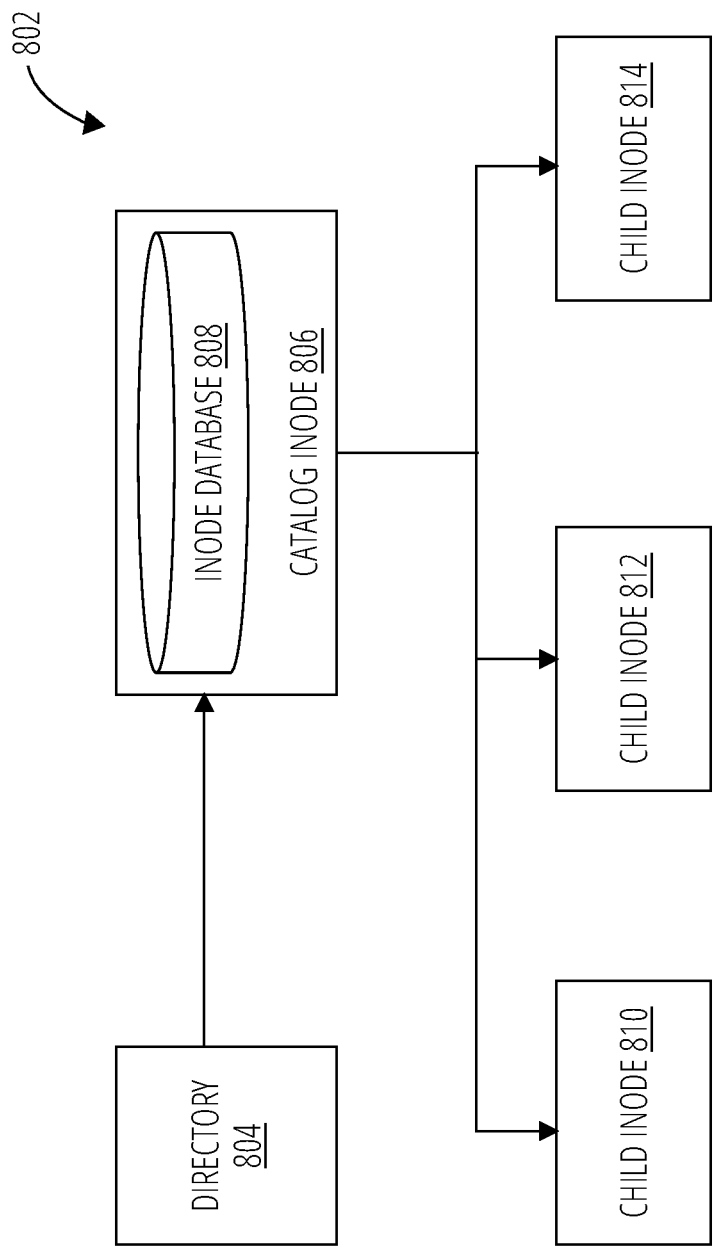
FIG. 8 illustrates one embodiment of a block diagram of a redirection layer.

FIG. 8 illustrates one embodiment of a block diagram of a redirection layer. The example redirection layer as illustrated in FIG. 8 can be part of a node (e.g., node 302, node 312) within a distributed storage system, for example, redirection layer 310, redirection layer 320 as illustrated in FIG. 3. In an example, redirection layer 802 can support non-disruptive file moves in response to bottleneck conditions as described herein. FIG. 8 provides a general overview of an example redirection layer and FIG. 9A to FIG. 9H provide a step-by-step example of a non-disruptive file move that can be triggered in response to detection of a bottleneck condition.

In an example, redirection layer 802 includes directory 804 that points to catalog inode 806. In one embodiment, catalog inode 806 includes inode database 808 that operates as a multipart catalog that lists a plurality of child inodes (e.g., child inode 810, child inode 812, child inode 814). In such an embodiment, the child inodes each store components of file data such that a first component of data may be stored in child inode 810, a second component of data may be stored in child inode 812, a third component of data may be stored in child inode 814, etc. As a result, a conceptual location of a file may be disassociated with the actual location of the stored data. Example uses of the components illustrated in FIG. 8 are provided within the context of a non-disruptive file movement in the figures that follow.

Figure 9A:
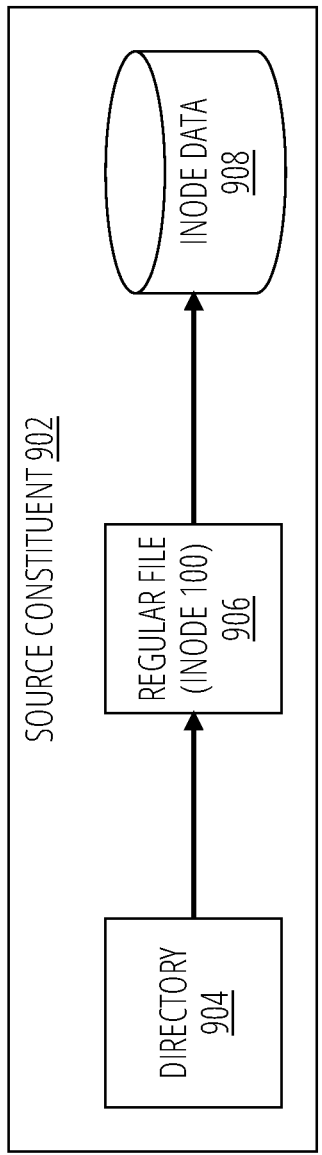
FIG. 9A illustrates a first stage of an example movement of a file from a first constituent to a second constituent using an example non-disruptive file move, for example, in response to a bottleneck condition.

FIG. 9A illustrates a first stage of an example movement of a file from a first constituent to a second constituent using an example non-disruptive file move, for example, in response to a bottleneck condition. As an example, all of the elements illustrated in FIG. 9A may reside in source constituent 902.

Initially, directory 904 can have a direct link pointing to regular file (inode 100) 906. In an example, this can be in a public inode space. In the example illustrated in FIG. 9A, regular file (inode 100) 906 is in the same constituent as directory 904. Alternatively, if regular file (inode 100) 906 and directory 904 are in different constituents, directory 904 would have a remote hard link to regular file (inode 100) 906. Inode data 908 stores the user data for regular file (inode 100) 906.

Figure 9B:
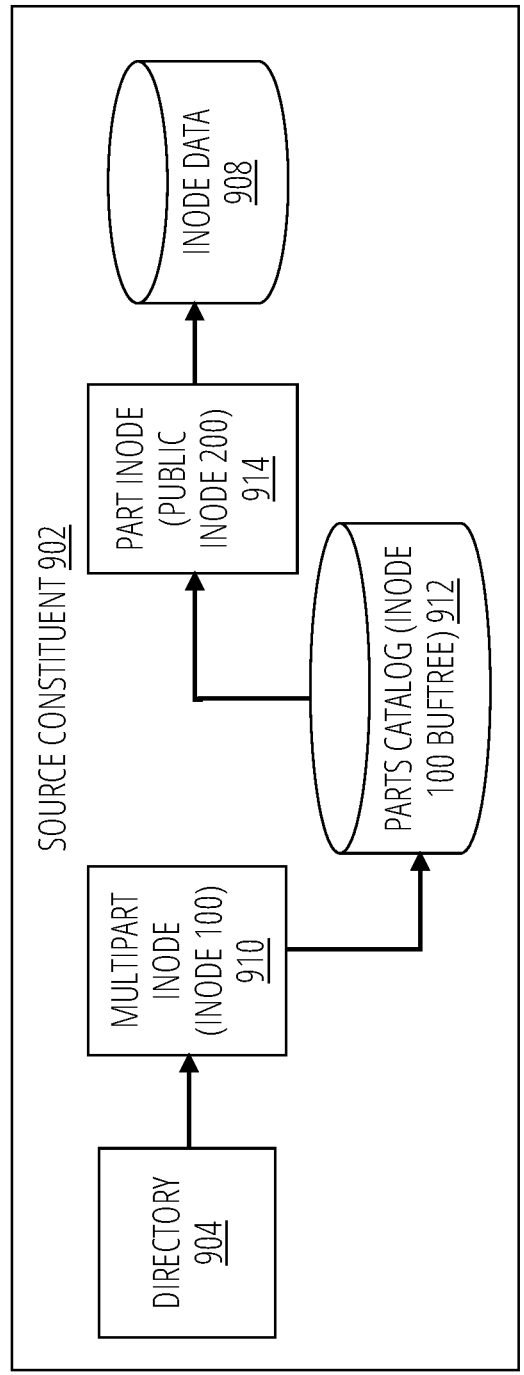
FIG. 9B illustrates a second stage of an example movement of a file from a first constituent to a second constituent using an example non-disruptive file move, for example, in response to a bottleneck condition.

FIG. 9B illustrates a second stage of an example movement of a file from a first constituent to a second constituent using an example non-disruptive file move, for example, in response to a bottleneck condition. As an example, all of the elements illustrated in FIG. 9B may reside in source constituent 902.

In the example of FIG. 9B, regular file (inode 100) 906 has been converted to multipart inode (inode 100) 910. That is regular file (inode 100) 906 has been converted to a regular file that uses multipart inodes as its on-disk representation.

In a WAFL example, a multipart inode subsystem can provide a WAFL message to perform the conversion from regular file (inode 100) 906 to multipart inode (inode 100) 910. The conversion process (whether WAFL or other) allocates a new inode (part inode (public inode 200) 914) in the same constituent as the original inode (multipart inode (inode 100) 910). Part inode (public inode 200) 914 is the part inode to which parts catalog (inode 100 buftree) 912 points. Parts catalog (inode 100 buftree) 912 can provide links to any number of part inodes in a similar manner. In an example, parts catalog (inode 100 buftree) 912 is a database that contains an entry that references part inode (public inode 200) 914. The original inode (regular file (inode 100) 906) identity information (e.g., inode number, generation number) does not change as part of the conversion to multipart inode (inode 100) 910.

Directory 904 that contains a link to regular file (inode 100) 906 still points to the same inode (now multipart inode (inode 100) 910) except that the inode acts as a multipart inode after the conversion and parts catalog (inode 100 buftree) 912 provides further indirection to point to part inode (public inode 200) 914 that contains the buftree for regular file (inode 100) 906. Once the original inode (regular file (inode 100) 906) is converted to a multipart inode (multipart inode (inode 100) 910) the corresponding part inode(s) (part inode (public inode 200) 914) can be moved from a first constituent to a second constituent without the knowledge of external NAS clients. In an example, the file movement is part of file rebalancing activities that are based on operations by a rebalancing engine and/or a rebalancing scanner.

In the example of FIG. 9B, multipart inode (inode 100) 910 is not quiesced because multipart inode (inode 100) 910 can still be accessed by a client. It is only part inode (public inode 200) 914 that cannot be accessed temporarily.

Figure 9C:
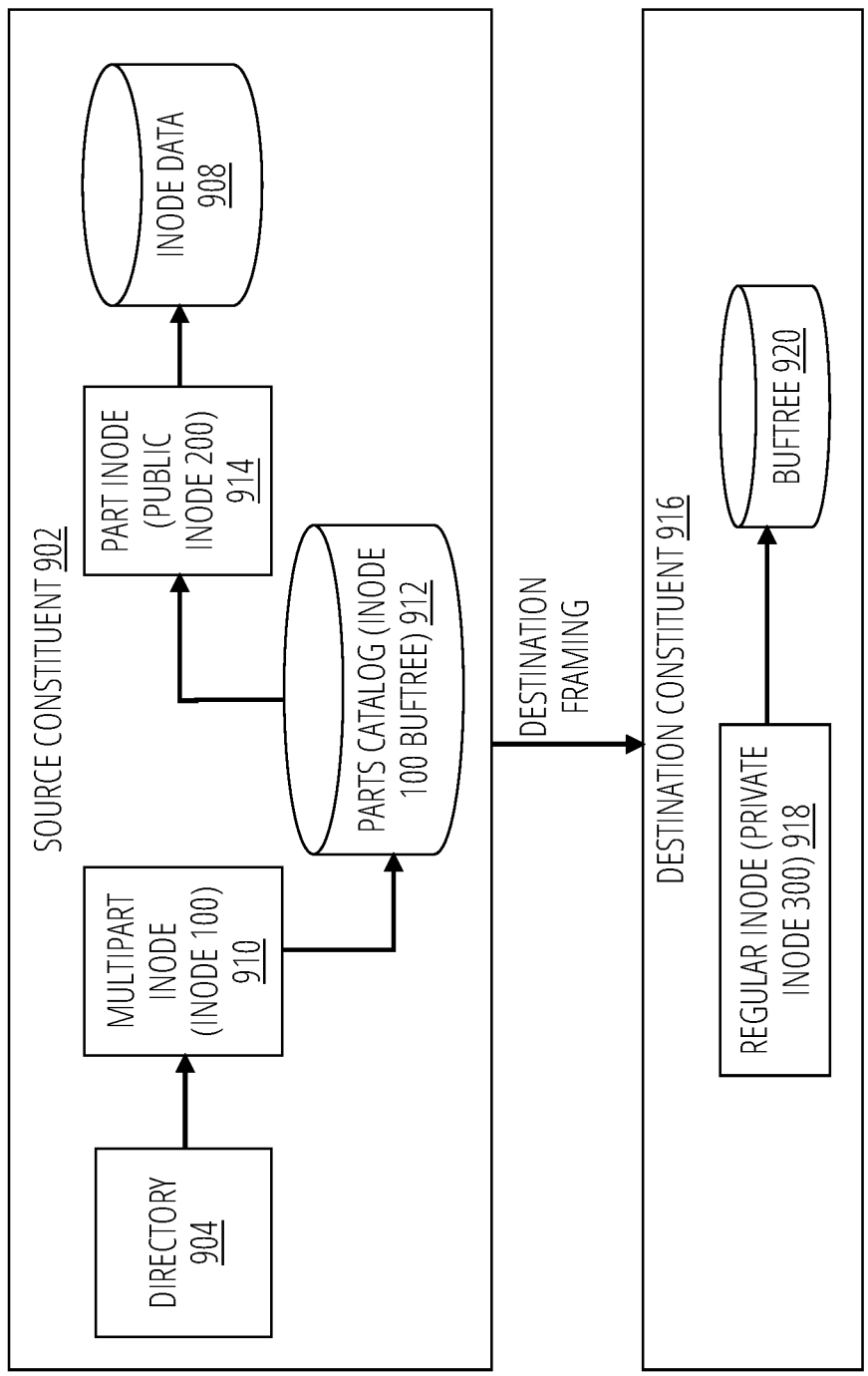
FIG. 9C illustrates a third stage of an example movement of a file from a first constituent to a second constituent using an example non-disruptive file move, for example, in response to a bottleneck condition.

FIG. 9C illustrates a third stage of an example movement of a file from a first constituent to a second constituent using an example non-disruptive file move, for example, in response to a bottleneck condition. Once the original inode is converted to a multipart inode (e.g., multipart inode (inode 100) 910), the part inode (e.g., part inode (public inode 200) 914) can be moved from source constituent 902 to destination constituent 916 without disruption to (or knowledge of) external NAS clients. The created inode (e.g., regular inode (private inode 300) 918) is a private inode and buftree 920 is framed but not allocated. That is, the L0 blocks of buftree 920 are not filled at this stage. Once buftree 920 has been framed, the cutover can be performed. In some cases, if the cutover time window is reached while the framing is still in progress the cutover can be performed with the partially framed buftree and the framing can be finished after the cutover.

Figure 9D:
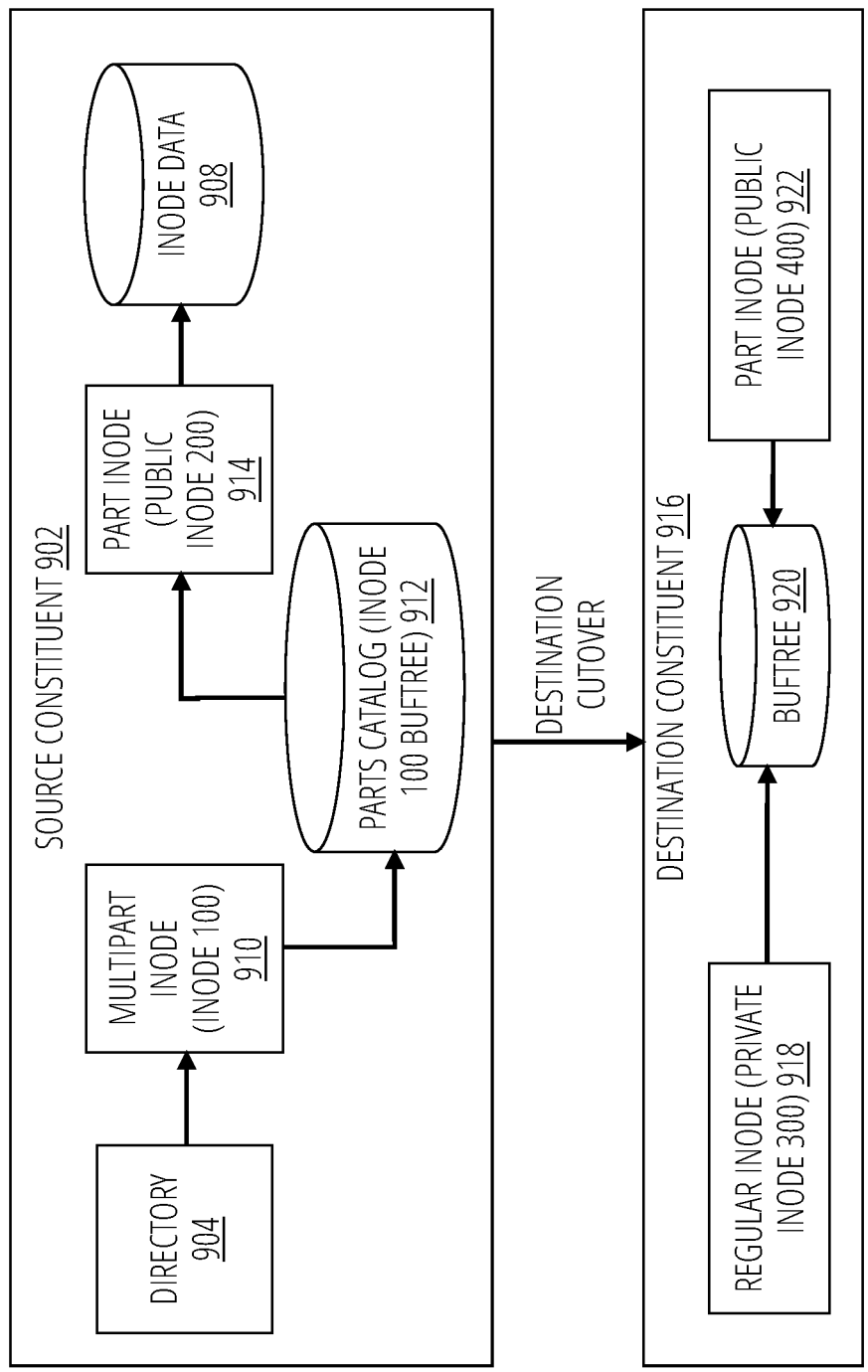
FIG. 9D illustrates a fourth stage of an example movement of a file from a first constituent to a second constituent using an example non-disruptive file move, for example, in response to a bottleneck condition.

FIG. 9D illustrates a fourth stage of an example movement of a file from a first constituent to a second constituent using an example non-disruptive file move, for example, in response to a bottleneck condition. As part of the cutover process, a new public inode (e.g., part inode (public inode 400) 922) is created on destination constituent 916. This new public inode (part inode (public inode 400) 922) will be the equivalent of the part inode (part inode (public inode 200) 914) on source constituent 902.

Figure 9E:
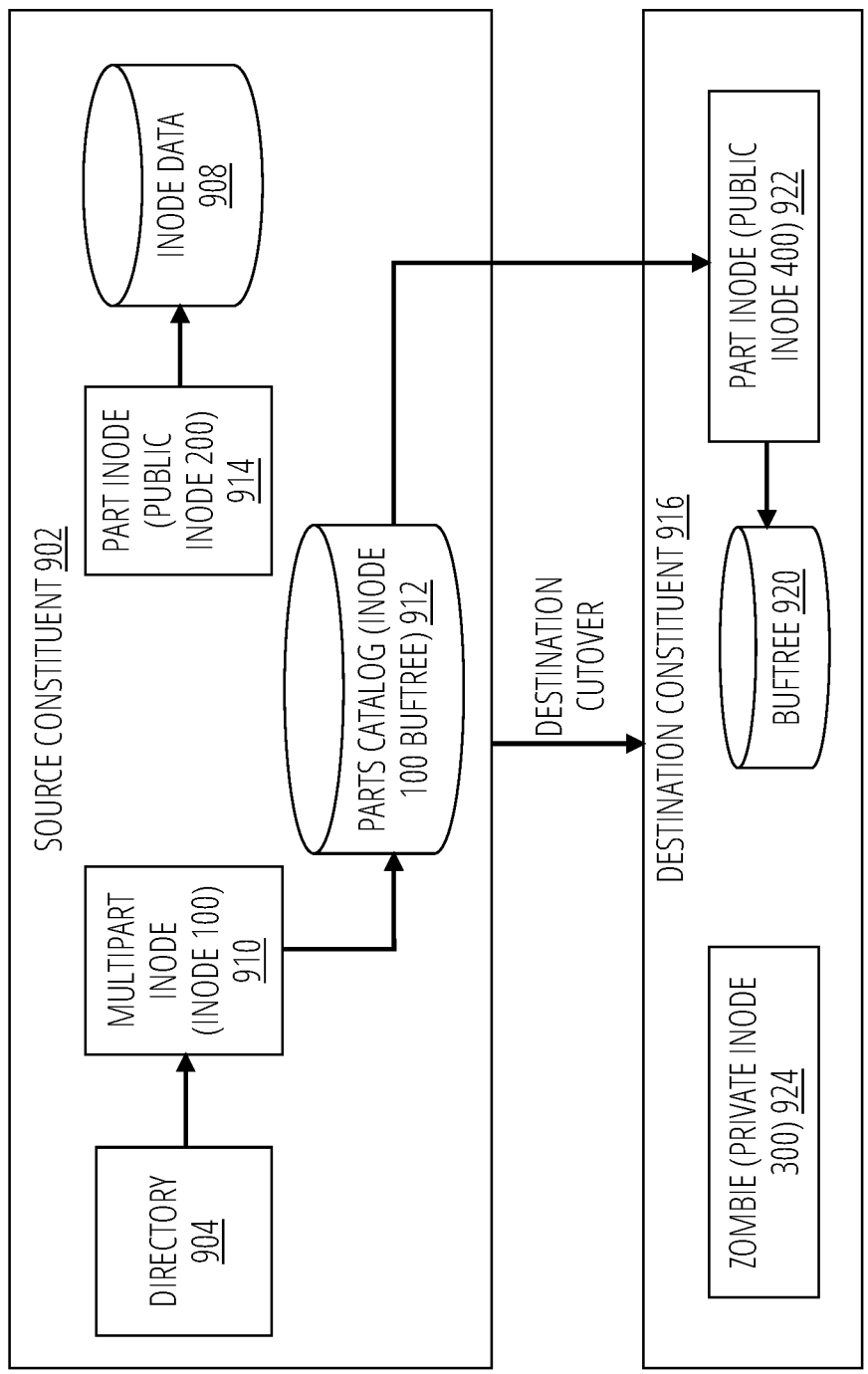
FIG. 9E illustrates a fifth stage of an example movement of a file from a first constituent to a second constituent using an example non-disruptive file move, for example, in response to a bottleneck condition.

FIG. 9E illustrates a fifth stage of an example movement of a file from a first constituent to a second constituent using an example non-disruptive file move, for example, in response to a bottleneck condition. As part of the cutover, parts catalog (inode 100 buftree) 912 of multipart inode (inode 100) 910 is changed to point to part inode (public inode 400) 922 on destination constituent 916. The new public inode (part inode (public inode 400) 922) will be equivalent to part inode (public inode 200) 914. The framed buftree (buftree 920) with the absent allocated blocks is attached to part inode (public inode 400) 922. The private inode (regular inode (private inode 300) 918) that was holding buftree 920 will undergo a process to free the private node (zombie (private inode 300) 924).

At this stage, the new public inode (part inode (public inode 400) 922) will assume the identity of the part inode (part inode (public inode 200) 914) with the parts catalog (parts catalog (inode 100 buftree) 912) of the multipart inode (multipart inode (inode 100) 910) that was referencing the old part inode (part inode (public inode 200) 914) is now pointing to the new part inode (part inode (public inode 400) 922) at destination constituent 916. Thus, in a WAFL environment, any WAFL message accessing multipart inode (inode 100) 910 will only see part inode (public inode 400) 922 at destination constituent 916. At this stage, part inode (public inode 200) 914 does not have a parts catalog entry pointing to it.

Figure 9F:
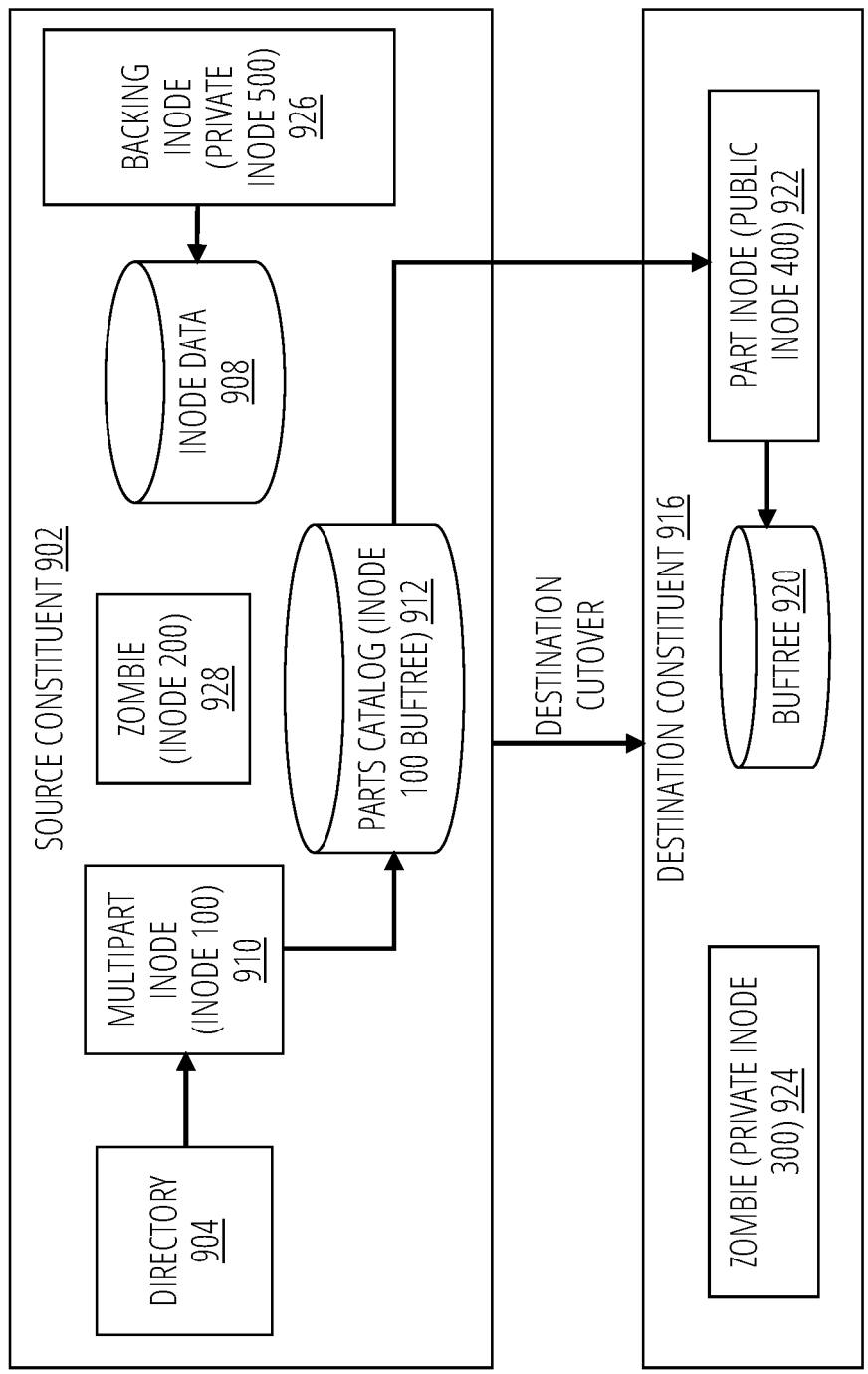
FIG. 9F illustrates a sixth stage of an example movement of a file from a first constituent to a second constituent using an example non-disruptive file move, for example, in response to a bottleneck condition.

FIG. 9F illustrates a sixth stage of an example movement of a file from a first constituent to a second constituent using an example non-disruptive file move, for example, in response to a bottleneck condition. After the cutover process is finished, the file is now available for writes to the file. Access will now flow to part inode (public inode 400) 922 residing in destination constituent 916. The old part inode (part inode (public inode 200) 914) is freed (now zombie (inode 200) 928), but inode data 908 is not attached to zombie (inode 200) 928.

However, inode data 908 is still needed to populate the L0 blocks of part inode (public inode 400) 922 at destination constituent 916. This is accomplished by transferring contents of inode data 908 to a private inode (backing inode (private inode 500) 926) that serves as a private backing metafile for inode data 908. Now, while the file is accessible by the NAS clients for reads/writes, the L0 blocks are transferred from backing inode (private inode 500) 926 in source constituent 902 to part inode (public inode 400) 922 in the public inode space.

Figure 9G:
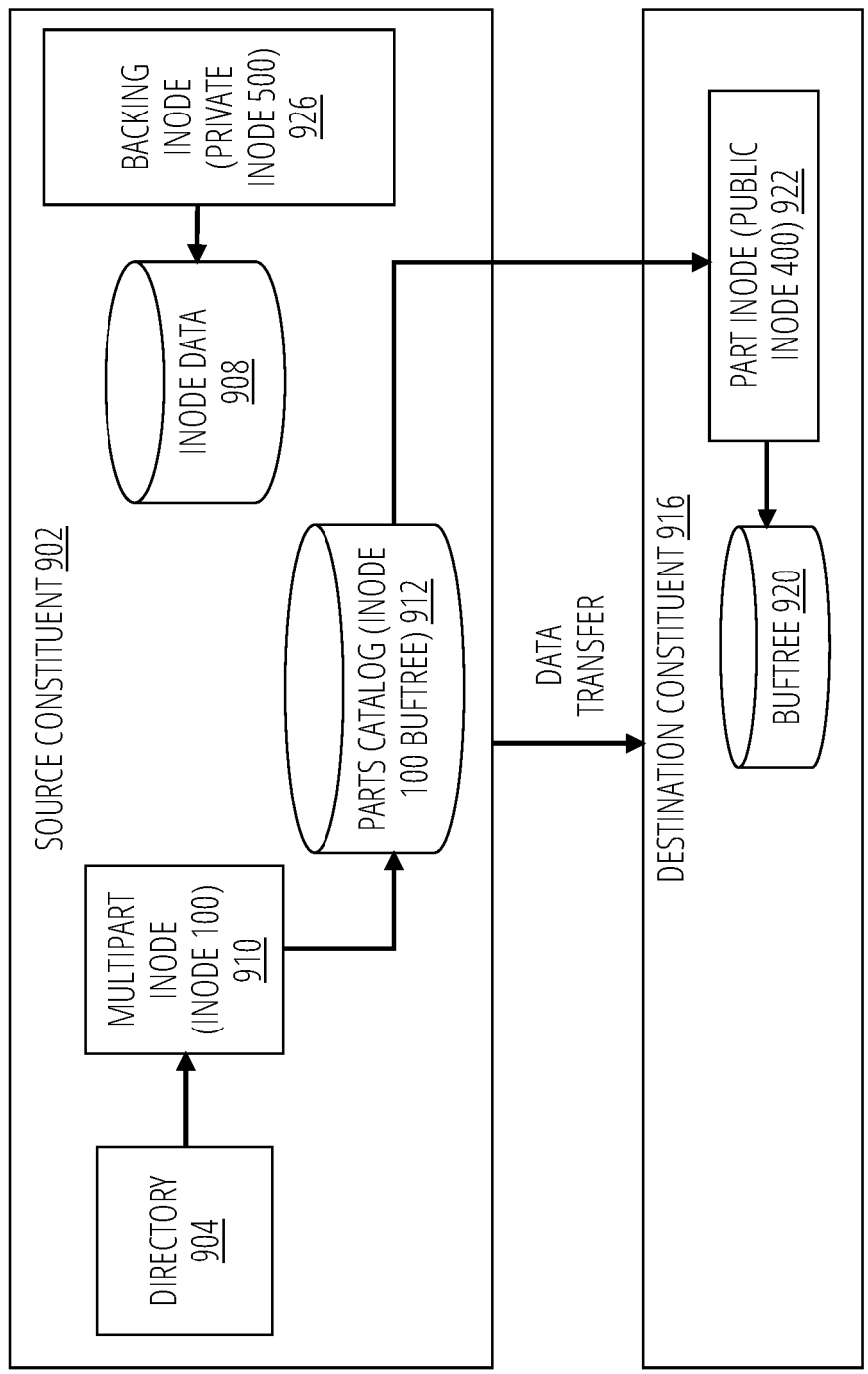
FIG. 9G illustrates a seventh stage of an example movement of a file from a first constituent to a second constituent using an example non-disruptive file move, for example, in response to a bottleneck condition.

FIG. 9G illustrates a seventh stage of an example movement of a file from a first constituent to a second constituent using an example non-disruptive file move, for example, in response to a bottleneck condition. In an example, after the entire data transfer is finished, the source inode (part inode (public inode 200) 914/zombie (private inode 300) 924) is released by freeing all the blocks associated with that source inode. Similarly, the private inode (regular inode (private inode 300) 918/zombie (private inode 200) 928) is released by freeing all of the blocks associated with the private inodes in destination constituent 916.

Figure 9H:
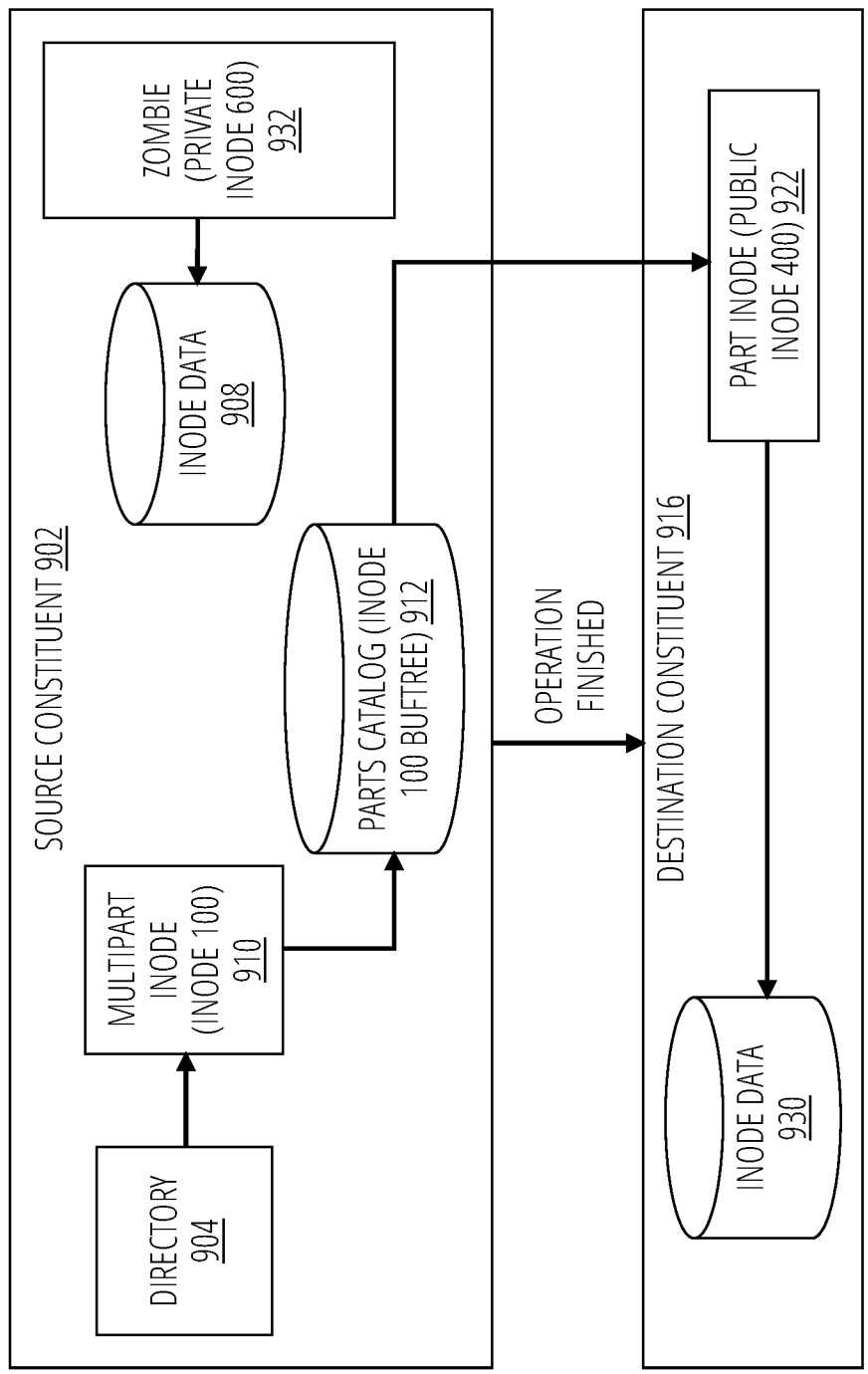
FIG. 9H illustrates an eighth stage of an example movement of a file from a first constituent to a second constituent using an example non-disruptive file move, for example, in response to a bottleneck condition.

FIG. 9H illustrates an eighth stage of an example movement of a file from a first constituent to a second constituent using an example non-disruptive file move, for example, in response to a bottleneck condition. Finally, the blocks associated with backing inode (private inode 500) 926/inode zombie (private inode 600) 932 can be released.

Figure 10:
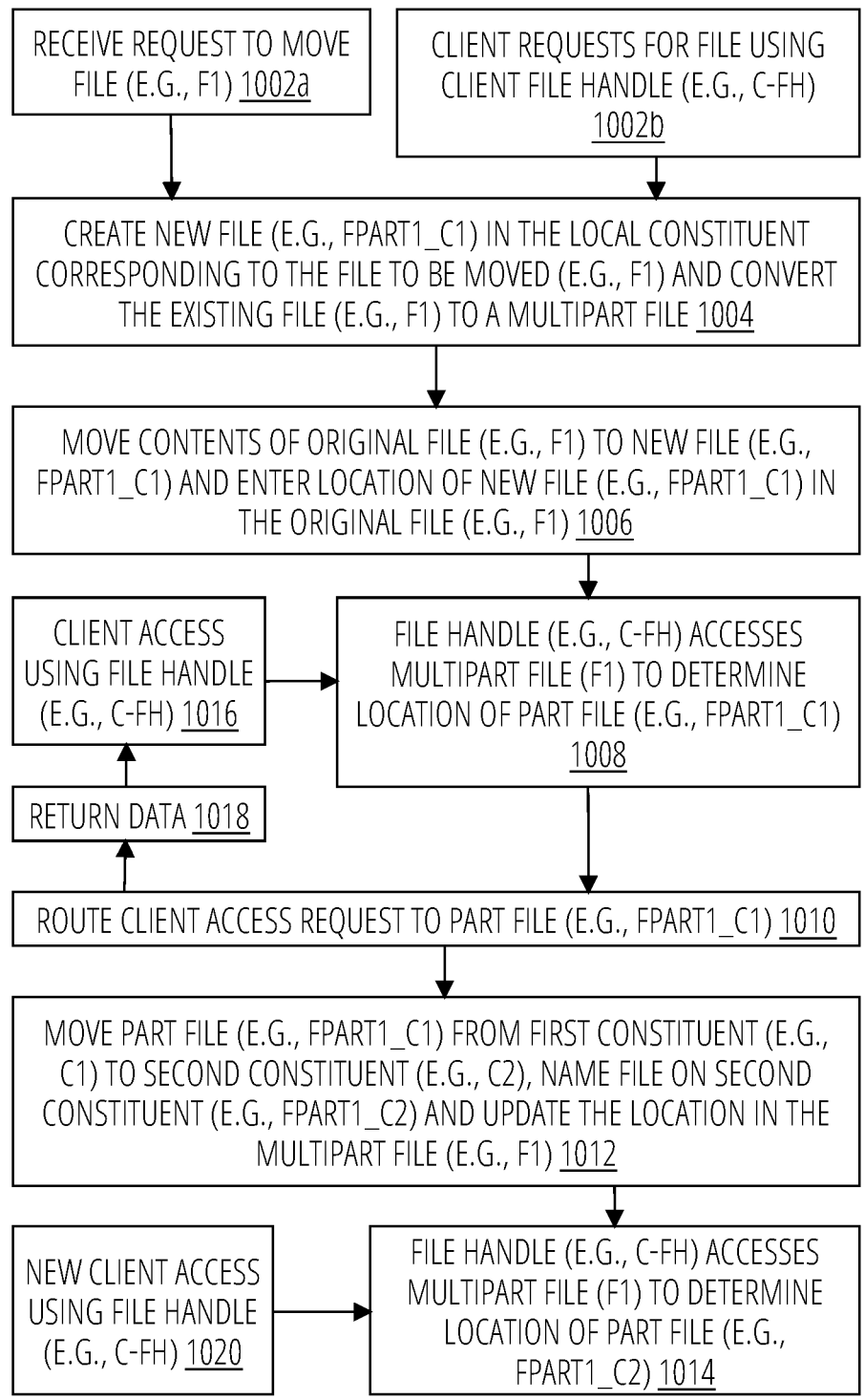
FIG. 10 is a flow diagram of an example non-disruptive file move that can be performed in response to detection of a bottleneck condition.

FIG. 10 is a flow diagram of an example non-disruptive file move that can be performed in response to detection of a bottleneck condition. In general, rebalancing of file between multiple constituents is a disruptive process that can interfere with client device access to files during the rebalancing process. Disruptive rebalancing has drawbacks including interruption of access to files, which interferes with operation of the file system. As described herein, an inode structure called a multipart inode forms the building blocks to non-disruptively move a file between constituents. In an example, a multipart inode acts as a redirector file (e.g., redirection layer 310, redirection layer 320, redirection layer 802) so that client still has access to valid file handle thus ensuring no disruptions.

For the following example, assume file (F1) is being moved from a first constituent (C1) to another constituent (C2) using a non-disruptive file move technique. In the example, of FIG. 10, a request to move a file is received (e.g., block 1002*a*), for example, in response to detection of a bottleneck condition by control/management mechanisms corresponding to the first constituent (C1). Requests and/or triggers to move files can be handled in other ways, for example, a trigger to move a file can be self-generated by the mechanisms for the first constituent (C1) that are responsible for moving (e.g., rebalancing) files.

The file to be moved (F1) has a corresponding file handle (C-FH) that client devices use to access the file (e.g., block 1002*b*). During normal operation this file handle (C-FH) is used by client devices when generating requests to access the file (F1, which is currently on the first constituent (C1)). In order to provide a non-disruptive file move, clients should be able to utilize the same file handle (C-FH) to access the file (F1) during the movement process (otherwise, the move would be a disruptive move because file access would be temporarily interrupted).

When a file movement (e.g., non-disruptive retroactive file movement) occurs, a new file in C1 (FPart1_C1) is created and existing file (F1) is converted to a multipart file (e.g., block 1004). In an example, the contents of the original file (F1) are moved to the new file (FPart1_C1) and the location of the new file (FPart1_C1) is an entry in the existing file (F1) that is now a multipart file (e.g., block 1006).

When the client uses file handle (C-FH) to access the file (e.g., block 1016), the access first lands into multipart file F1 where, as a multipart file, the access mechanism obtains a location of part file (FPart_C1) that hosts the data (e.g., block 1010). The mechanism determines that part inode FPart1_C1 is in location C1 and routes the client traffic to FPart1_C1 and returns back requested data (e.g., block 1018).

In an example, after converting the file to multipart file, control/management mechanisms on the first constituent (C1) move the file (FPart1_C1) from the first constituent (C1) to a second constituent (C2). Once the file is moved to the second constituent (C2) as file FPart1_C2, the location of part inode in multipart inode is moved to FPart1_C2 in C2 atomically (e.g., block 1012).

New client traffic using the file handle (C-FH) (e.g., block 1020) gets routed to FPart1_C2 through multipart file F1 (e.g., block 1014). Hence, there is no disruption to client access as the file handle is intact throughout the file movement. Note that above use case of multipart inode was specifically for non-disruptive file movement where one multipart file could have only one part inode. There are other use cases of multipart inodes.

Figure 11:
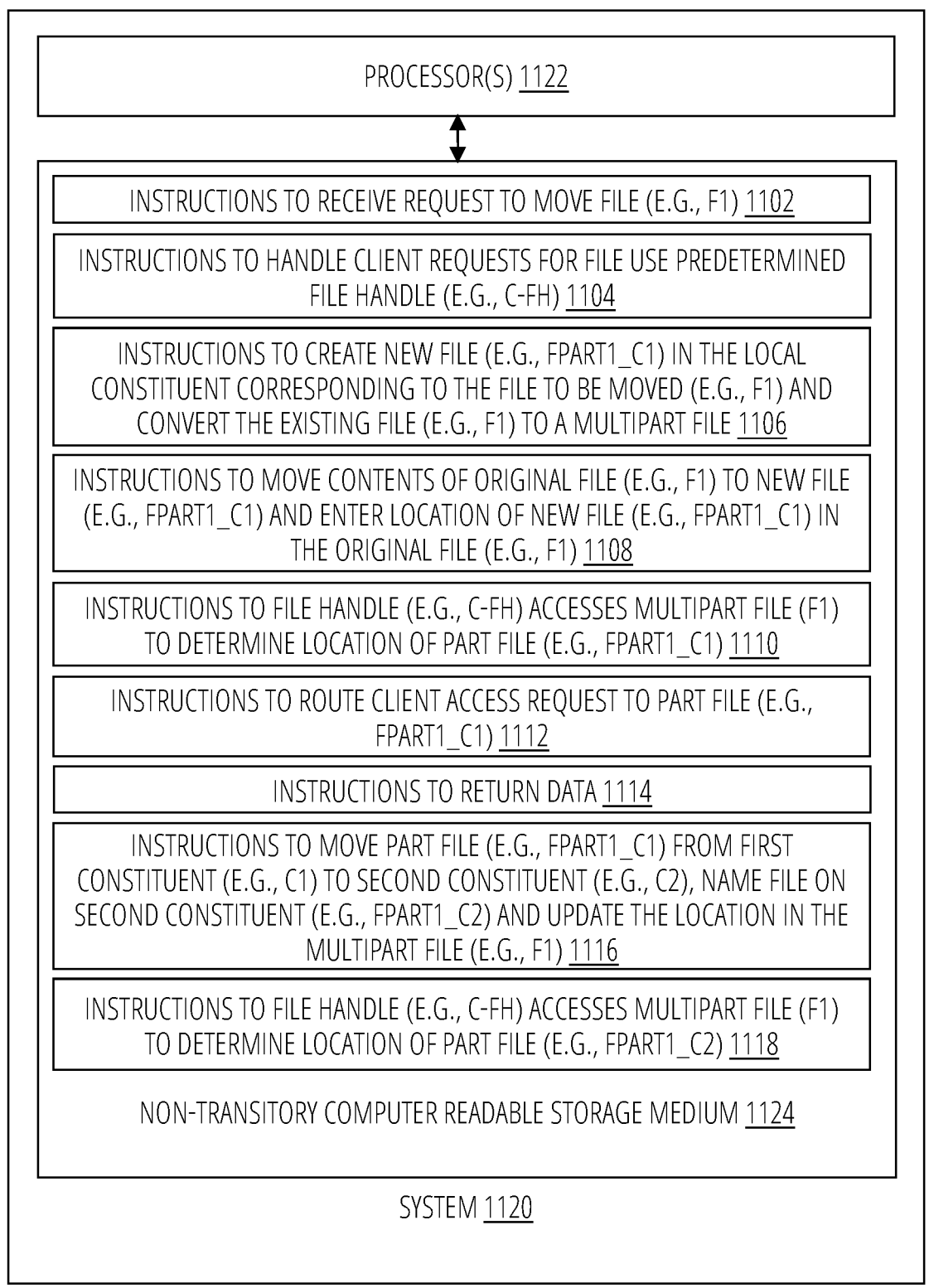
FIG. 11 is an example of a system to provide a process for performing an example non-disruptive file move that can be performed in response to detection of a bottleneck condition.

FIG. 11 is an example of a system to provide a process for performing an example non-disruptive file move that can be performed in response to detection of a bottleneck condition. In an example, system 1120 can include processor(s) 1122 and non-transitory computer readable storage medium 1124. In an example, processor(s) 1122 and non-transitory computer readable storage medium 1124 can be part of a node (e.g., node 104, node 106, node 200, node 302, node 312) having a storage operating system (e.g., storage operating system 210) that can provide some or all of the functionality of the ONTAP software as mentioned above. In an example, system 1120 can provide the functionality described herein with respect to non-disruptive file moves.

Non-transitory computer readable storage medium 1124 may store instructions 1102, 1104, 1106, 1108, 1110, 1112, 1114, 1116 and 1118 that, when executed by processor(s) 1122, cause processor(s) 1122 to perform various functions. Examples of processor(s) 1122 may include a microcontroller, a microcontroller, a microprocessor, a CPU, a GPU, a DPU, an ASIC, an FPGA, a SoC, etc. Examples of non-transitory computer readable storage medium 1124 include tangible media such as RAM, ROM, EEPROM, flash memory, a hard disk drive, etc.

For the following example, assume file (F1) is being moved from a first constituent (C1) to another constituent (C2). Instructions 1102 cause processor(s) 1122 to receive a request to move a file, for example, by control mechanisms corresponding to the first constituent (C1). Requests and/or triggers to move files can be handled in other ways, for example, a trigger to move a file can be self-generated by the mechanisms for the first constituent (C1) that are responsible for moving (e.g., rebalancing) files.

The file to be moved (F1) has a corresponding file handle (C-FH) that client devices use to access the file. During operation instructions 1104 cause processor(s) 1122 to use this file handle (C-FH) is used by client devices when generating requests to access the file (F1, which is currently on the first constituent (C1)). To provide a non-disruptive file move, clients should be able to utilize the same file handle (C-FH) to access the file (F1) during the movement process (otherwise, the move would be a disruptive move because file access would be temporarily interrupted).

Instructions 1106 cause processor(s) 1122 to, in response to a file movement (e.g., non-disruptive retroactive file movement), create a new file in C1 (FPart1_C1) and convert existing file (F1) to a multipart file.

Instructions 1108 cause processor(s) 1122 to move the contents of the original file (F1) to the new file (FPart1_C1) and enter the location of the new file (which is a part inode) in the original file (F1) to provide the appropriate redirection.

Instructions 1110 cause processor(s) 1122 to handle file accesses from a client using the file handle (C-FH) to access the file, where the access first lands into multipart file F1 from which the access mechanism obtains a location of part file (FPart_C1) that hosts the data.

Instructions 1112 cause processor(s) 1122 to determine that part inode FPart1_C1 is in location C1 and route the client traffic to FPart1_C1.

Instructions 1114 cause processor(s) 1122 to return required data for the access request.

Instructions 1116 cause processor(s) 1122 to after converting the file to multipart file, constituent rebalancing uses a rebalancing engine to effectively move the file (FPart1_C1) from the first constituent (C1) to a second constituent (C2). Once the file is moved to the second constituent (C2) as file FPart1_C2, and the location of part inode in multipart inode is changed to FPart1_C2 in C2 atomically.

Instructions 1118 cause processor(s) 1122 to handle new client traffic using the file handle (C-FH) and routes to FPart1_C2 through multipart file F1. Hence, there is no disruption to client access as the file handle is intact throughout the file movement. Note that above use case of multipart inode was specifically for non-disruptive file movement where one multipart file could have only one part inode. There are other use cases of multipart inodes.

In a more detailed example, the mechanism described above could intentionally break up inode data 908 into a plurality of part inodes each with a subset of the data, and the catalog pointing to all of the part inodes in sequence to distribute the workload for the file.

FIG. 12 is a schematic block diagram of a storage operating system that may be advantageously used with the subject matter. One or more network blades (e.g., network blade (N-Blade) 1202) and one or more disk blades (e.g., disk blade (D-Blade) 1206) can be interconnected with each other and configured to provide various functional components of storage operating system 1200, which operate to provide the load sharing and caching functionality utilizing redirection layers as described above.

Storage operating system 1200 includes a series of software layers organized to form an integrated network protocol stack or, more generally, multi-protocol engine 1204 that provides data paths for clients to access information stored on a node using block and file access protocols. In an example, multi-protocol engine 1204 includes a media access layer (e.g., media access 1242, media access 1244) of network drivers (e.g., gigabit Ethernet drivers) that interfaces to network protocol layers, such as the Internet Protocol (IP) layer (e.g., IP 1238, IP 1240) and the corresponding supporting transport mechanisms, the Transport Control Protocol (TCP) layer (e.g., TCP 1230, TCP 1234) and the User Datagram Protocol (UDP) layer (e.g., UDP 1232).

An example file system (FS) protocol layer (e.g., FS 1236) provides multi-protocol file access and, to that end, includes support for Direct Access File System (DAFS) protocol (e.g., DAFS 1216), Network File System (NFS) protocol (e.g., NFS 1220), Common Internet File System (CIFS) protocol (e.g., CIFS 1222) and the Hypertext Transfer Protocol (HTTP) (e.g., HTTP 1224). Virtual Interface (VI) layer (e.g., VI 1218) implements an architecture to provide direct access transport (DAT) capabilities, such as Remote Direct Memory Access (RDMA), to support Direct Access File System (DAFS) protocol (e.g., DAFS 1216).

An Internet Small Computer Systems Interface (iSCSI) driver layer (e.g., iSCSI 1228) provides block protocol access over TCP/IP network protocol layers, while a Cluster Fabric (CF) driver layer (e.g., CF interface 1210) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 1200 includes a series of software layers organized to form storage server 1208 that provides data paths for accessing information stored on disks of a node. To that end, storage server 1208 includes file system module 1248 in cooperating relation with remote access module 1250, RAID system 1252 and disk driver system 1254. RAID system 1252 manages the storage and retrieval of information to and from the volumes/disks in accordance with I/O operations, while disk driver system 1254 implements a disk access protocol such as, e.g., the SCSI protocol.

File system module 1248 implements a virtualization system of storage operating system 1200 through the interaction with one or more virtualization modules illustratively embodied as, e.g., a virtual disk (vdisk) module (not shown) and SCSI target module 1226. SCSI target module 1226 is generally disposed between the FC and iSCSI 1228, file system 1236 and file system 1248 to provide a translation layer of the virtualization system between the block (LUN) space and the file system space, where LUNs are represented as blocks.

File system module 1248 is illustratively a message-based system that provides logical volume management capabilities for use in access to the information stored on the storage devices, such as disks. That is, in addition to providing file system semantics, file system module 1248 provides functions normally associated with a volume manager. These functions include (i) aggregation of the disks, (ii) aggregation of storage bandwidth of the disks, and (iii) reliability guarantees, such as mirroring and/or parity (RAID).

File system module 1248 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 1248 uses files to store meta-data describing the layout of its file system; these meta-data files include, among others, an inode file. A file handle, i.e., an identifier that includes an inode number, is used to retrieve an inode from disk. As described in greater detail below, a rebalancing scanner can operation in storage operating system 1200 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 1252; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 1250 is operatively interfaced between file system module 1248 and RAID system 1252. Remote access module 1250 is illustratively configured as part of the file system to implement the functionality to determine whether a newly created data container, such as a subdirectory, should be stored locally or remotely. Alternatively, remote access module 1250 may be separate from the file system. As such, the description of remote access module 1250 being part of the file system should be taken as exemplary only. Further, remote access module 1250 determines which remote flexible volume should store a new subdirectory if a determination is made that the subdirectory is to be stored remotely. More generally, remote access module 1250 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 1250 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 216, storage adapter 224, cluster access adapter 220) may be configured to offload some or all of the packet processing and storage access operations, respectively, from the processor (e.g., processor 204, processor 206), to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 1208 is embodied as disk blade (D-Blade) 1206 of storage operating system 1200 to service one or more volumes of a disk array (e.g., disk array 146). In addition, multi-protocol engine 1204 is embodied as network blade (N-Blade) 1202 to: (i) perform protocol termination with respect to a client issuing incoming data access request packets over a network, as well as (ii) redirect those data access requests to any storage server of the cluster. Moreover, network blade (N-Blade) 1202 and disk blade (D-Blade) 1206 cooperate to provide a highly scalable, distributed storage system architecture for a cluster (e.g., cluster 100). To that end, each module includes a cluster fabric (CF) interface module (e.g., CF interface 1210, CF interface 1246) adapted to implement intra-cluster communication among the modules (e.g., utilizing CF protocol 1212), including disk element to disk element communication for data container striping operations, for example.

The protocol layers, e.g., the NFS/CIFS layers and the iSCSI/IFC layers, of network blade (N-Blade) 1202 function as protocol servers that translate file-based and block-based data access requests from clients into CF protocol messages used for communication with disk blade (D-Blade) 1206. That is, the network element servers convert the incoming data access requests into file system primitive operations (commands) that are embedded within CF messages by CF interface 1210 for transmission to disk blade (D-Blade) 1206. Notably, CF interface 1210 and CF interface 1246 cooperate to provide a single file system image across all disk blades in a cluster. Thus, any network port of a network element that receives a client request can access any data container within the single file system image located on any disk element of the cluster.

Further, in an illustrative aspect of the disclosure, network blade (N-Blade) 1202 and disk blade (D-Blade) 1206 are implemented as separately scheduled processes of storage operating system 1200; however, in an alternate aspect, the network blade (N-Blade) 1202 and disk blade (D-Blade) 1206 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 116. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 1210 and CF interface 1246 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade (N-Blade) 1202) to a destination (e.g., disk blade (D-Blade) 1206). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 130. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

Figure 13:
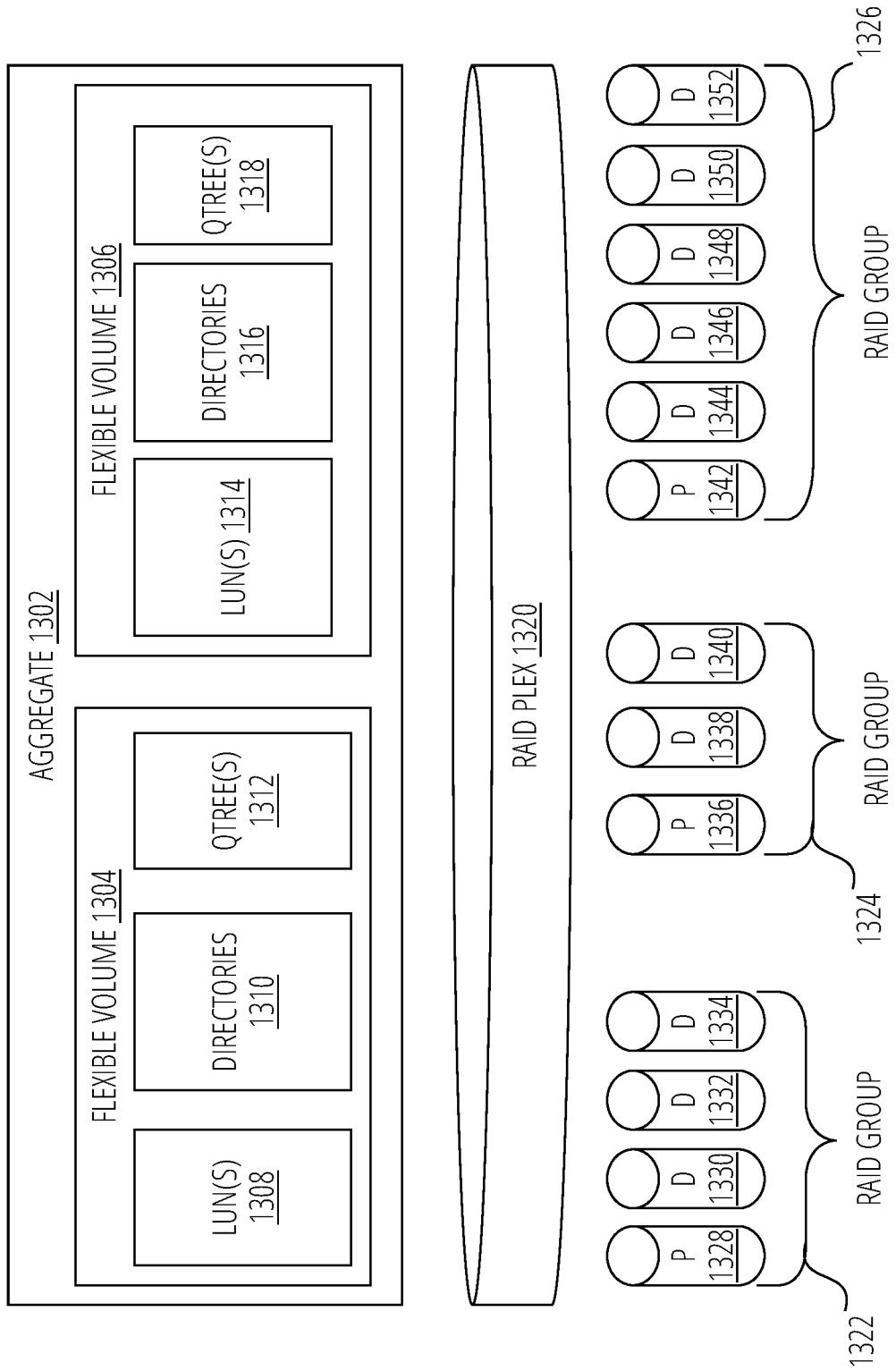
FIG. 13 illustrates one embodiment of a block diagram of an aggregate that can provide multiple flexible volumes (member volumes) that can be managed to provide load sharing and caching as described herein.

FIG. 13 illustrates one embodiment of a block diagram of an aggregate that can provide multiple flexible volumes (member volumes) that can be managed to provide load sharing and caching as described herein. In one embodiment, a file system layout is provided that apportions an underlying physical volume into one or more virtual volumes (or flexible volume) of a storage system.

In such an embodiment, the underlying physical volume is an aggregate comprising one or more groups of disks, such as RAID groups, of the node. In an example, aggregate 1302 has its own physical volume block number (pvbn) space and maintains meta-data, such as block allocation structures, within that pvbn space. Each flexible volume (e.g., flexible volume 1304, flexible volume 1306) has its own virtual volume block number (vvbn) space and maintains meta-data, such as block allocation structures, within that vvbn space. Each flexible volume is a file system that is associated with a container file; the container file is a file in aggregate 1302 that contains all blocks used by the flexible volume. Moreover, each flexible volume comprises data blocks and indirect blocks that contain block pointers that point at either other indirect blocks or data blocks.

LUN(s) 1308, directories 1310, Qtree(s) 1312 and Qtree(s) 1318 may be included within flexible volume 1304 and/or flexible volume 1306, such as dual vbn flexible volumes, that, in turn, are contained within aggregate 1302. In one embodiment, flexible volume 1304 and/or flexible volume 1306 including elements within the flexible volumes may comprise junctions to provide redirection information to other flexible volumes, which may be contained within aggregate 1302, may be stored in aggregate service by other key modules in the distributed file system. Assets, the description of elements being stored within a flexible volume should be taken as exemplary only. Aggregate 1302 is illustratively layered on top of the RAID system, which is represented by at least one RAID plex 1320 (depending upon whether the storage configuration is mirrored), wherein each RAID plex 1320 includes at least one RAID group (e.g., RAID group 1322, RAID group 1324, RAID group 1326). Each RAID group further comprises a plurality of disks, one or more data (D) disks (e.g., 1330, 1332, 1334, 1338, 1340, 1344, 1346, 1348, 1350, 1352) and at least one (P) parity disk (e.g., 1328, 1336, 1342).

Whereas aggregate 1302 is analogous to a physical volume of a conventional storage system, a flexible volume (e.g., flexible volume 1304, flexible volume 1306) is analogous to a file within that physical volume. That is, aggregate 1302 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) inode, such as an embedded inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Aggregate 1302 can be configured as a FlexGroup as supported by the ONTAP® operating system. However, it is expressly contemplated that any appropriate storage operating system may be enhanced for use in accordance with the inventive principles described herein. In the FlexGroup example, a constituent volume refers to the underlying flexible volume (e.g., flexible volume 1304, flexible volume 1306) that provide the storage functionality of the Flex-Group. A FlexGroup is a single namespace that can be made up of multiple constituent volumes ("constituents"). In an example, each FlexGroup contains an entity (e.g., "Flex-Group State") that has an object corresponding to each constituent of the FlexGroup and collects information for each constituent. The FlexGroup State can also exchange constituent information with other peer FlexGroups.

Figure 14:
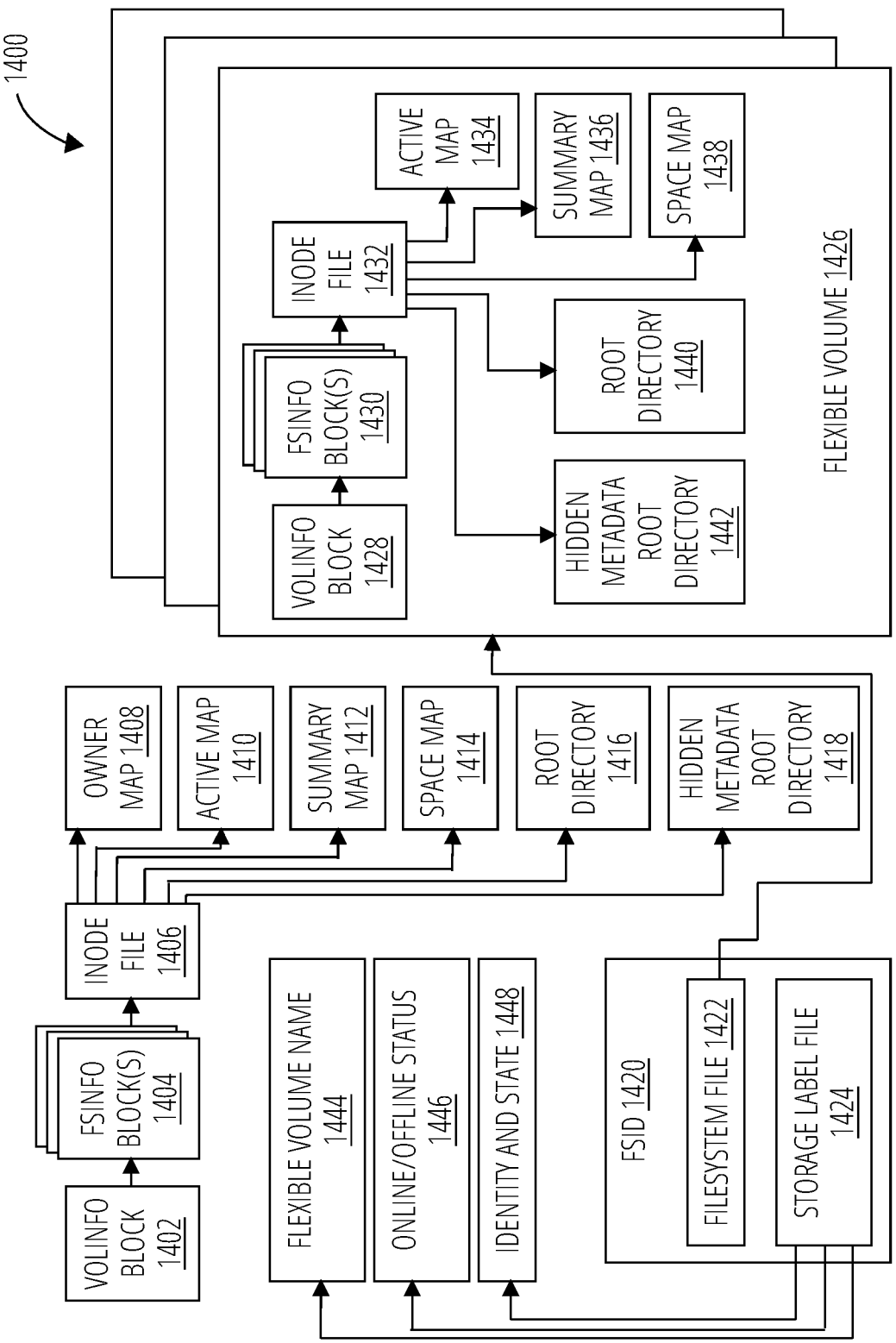
FIG. 14 illustrates one embodiment of a block diagram of an on-disk layout of the aggregate.

FIG. 14 illustrates one embodiment of a block diagram of an on-disk layout of an aggregate. Some of the elements illustrated in FIG. 14 can be utilized by a rebalancing scanner to evaluate files for potential movement to a remote container including, for example, filesystem file 1422, hidden metadata root directory 1442, etc.

The storage operating system (e.g., storage operating system 210) utilizes the RAID system (e.g., RAID system 1252), to assemble a physical volume of pvbns to create an aggregate (e.g., aggregate 1302), with pvbns 1 and 2 comprising a "physical" volinfo block 1402 for the aggregate. In an example, volinfo block 1402 contains block pointers to fsinfo block(s) 1404, each of which may represent a snapshot of the aggregate. Each fsinfo block(s) 1404 includes a block pointer to an inode file 1406 that contains inodes of a plurality of files, including owner map 1408, active map 1410, summary map 1412 and space map 1414, as well as other special meta-data files. Inode file 1406 further includes root directory 1416 and hidden metadata root directory 1418, the latter of which includes a namespace having files related to a flexible volume in which users cannot "see" the files. In an example, hidden metadata root directory 1418 includes the fsid/directory structure (Fsid 1420) that contains filesystem file 1422 and storage label file 1424. In an example, root directory 1416 in the aggregate is empty; files related to the aggregate are organized within hidden metadata root directory 1418.

In addition to being embodied as a container file having level 1 blocks organized as a container map, filesystem file 1422 includes block pointers that reference various file systems embodied as one or more flexible volume 1426. The aggregate maintains these flexible volumes at special reserved inode numbers. In an example, each flexible volume 1426 also has reserved inode numbers within its flexible volume space that are used for, among other things, the block allocation bitmap structures. As noted, the block allocation bitmap structures, e.g., active map 1434, summary map 1436 and space map 1438, are located in each flexible volume.

Specifically, each flexible volume 1426 has the same inode file structure/content as the aggregate, with the exception that there is no owner map and no fsid/file system file, storage label file directory structure in hidden metadata root directory 1442. To that end, each flexible volume 1426 has volinfo block 1428 that points to one or more fsinfo block(s) 1430, each of which may represent a snapshot, along with the active file system of the flexible volume. Each fsinfo block, in turn, points to an inode file 1432 that, as noted, has the same inode structure/content as the aggregate with the exceptions noted above. Each flexible volume 1426 has its own inode file 1432 and distinct inode space with corresponding inode numbers, as well as its own root directory 1440 and subdirectories of files that can be exported separately from other flexible volumes.

Storage label file 1424 contained within hidden metadata root directory 1418 of the aggregate is a small file that functions as an analog to a conventional RAID label. A RAID label includes physical information about the storage system, such as the volume name; that information is loaded into storage label file 1424. Illustratively, storage label file 1424 includes the flexible volume name 1444 of the associated flexible volume 1426, online/offline status 1446 of the flexible volume, and identity and state 1448 of the associated flexible volume (whether it is in the process of being created or destroyed).

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one example" or "an example" means that a particular feature, structure, or characteristic described in connection with the example is included in at least one embodiment of the disclosure. The appearances of the phrase "in one example" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

What is claimed is:

1. A non-transitory computer-readable storage medium having stored thereon instructions that, when executed by one or more processors, cause the one or more processors to:
receive a write request at a first data storage node having a first set of interface module(s), a first set of data management module(s), and a first set of data storage devices, the write request indicating a target file to be written;
determine whether conditions on the first node indicate a bottleneck condition;
trigger a non-disruptive file move in response to determining conditions on the first node indicate the bottleneck condition;
convert the target file in a first constituent on the first node to a multipart file in the first constituent with a file location for the multipart file in the first constituent in response to the trigger, wherein the multipart file is created from the target file and utilizes a directory that indicates a plurality of nodes corresponding to the multipart file;
create a new file in a second constituent;
move contents of the target file to a new file on the second constituent while maintaining access to the target file via an associated file handle via access to the multipart file; and
delete the target file from the first constituent.

2. The non-transitory computer-readable storage medium of claim 1 further comprising instructions that, when executed, cause the one or more processors to:
receive a subsequent request to move the new file from the second constituent to a third constituent;
create a new file in the third constituent;
move contents of the new file in the second constituent to the new file in the third constituent while maintaining access to the new file in the second constituent via the associated file handle and via access to the multipart file;
delete the new file from the second constituent.

3. The non-transitory computer-readable storage medium of claim 1 wherein the instructions that, when executed, cause the one or more processors to move contents of the target file to a new file in the second constituent while maintaining access to the target file via the associated file handle via access to the multipart file further comprise instructions that, when executed, cause the one or more processors to:
change location information in a buffer tree for the multipart file from indicating the target file in the first constituent to indicating the new file in the second constituent;
update a buffer tree associated with the new file in the second constituent to store inode data for the new file in the second constituent.

4. The non-transitory computer-readable storage medium of claim 1 wherein determining whether conditions on the first node indicate a bottleneck condition comprises applying a points-based analysis based on queue latency.

5. The non-transitory computer-readable storage medium of claim 4 wherein the points-based analysis is a function of at least raw access count and access percentile.

6. The non-transitory computer-readable storage medium of claim 5 wherein the raw access count and the access percentile are maintained in a bloom filter.

7. The non-transitory computer-readable storage medium of claim 1 wherein the instructions that, when executed, cause the one or more processors to create a new file in the second constituent further comprise instructions that, when executed, cause the one or more processors to:
generate a private file in the second constituent;
allocate space for a buffer tree for the private file in the second constituent;
create a public file in the second constituent, wherein the public file comprises the new file in the second constituent;
link the public file to the buffer tree for the private file;
remove the link from the private file to the buffer tree.

8. The non-transitory computer-readable storage medium of claim 1 wherein the new file in the second constituent comprises a part inode file and the multipart file comprises at least a link to a parts catalog having links to one or more part inode files that each comprise a portion of user data previously stored in the multipart file.

9. A system comprising:
a first data storage node having a first set of interface module(s), a first set of data management module(s), and a first set of data storage devices;
a second data storage node coupled with the first data storage node, the second data storage node having a second set of interface module(s), a second set of data management module(s), and a second set of data storage devices;
the first set of interface module(s) to receive a write request at a first data storage node having a first set of interface module(s), a first set of data management module(s), and a first set of data storage devices, the write request indicating a target file to be written, to determine whether conditions on the first node indicate a bottleneck condition, to trigger a non-disruptive file move in response to determining conditions on the first node indicate the bottleneck condition, to convert the target file in a first constituent on the first node to a multipart file in the first constituent with a file location for the multipart file in the first constituent in response to the trigger, wherein the multipart file is created from the target file and utilizes a directory that indicates a plurality of nodes corresponding to the multipart file, to create a new file in a second constituent, to move contents of the target file to a new file on the second constituent while maintaining access to the target file via an associated file handle via access to the multipart file, and to delete the target file from the first constituent.

10. The system of claim 9 wherein the second set of interface module(s) to receive a subsequent request to move the new file from the second constituent to a third constituent, to cause a new file to be created in the third constituent, to move contents of the new file in the second constituent to the new file in the third constituent while maintaining access to the new file in the second constituent via the associated file handle and via access to the multipart file, and to delete the new file from the second constituent.

11. The system of claim 9 moving contents of the target file to a new file in the second constituent while maintaining access to the target file via the associated file handle via access to the multipart file further comprises:
changing location information in a buffer tree for the multipart file from indicating the target file in the first constituent to indicating the new file in the second constituent;
updating a buffer tree associated with the new file in the second constituent to store inode data for the new file in the second constituent.

12. The system of claim 9 wherein determining whether conditions on the second node indicate a bottleneck condition comprises applying a points-based analysis based on queue latency.

13. The system of claim 12 wherein the points-based analysis is a function of at least raw access count and access percentile.

14. The system of claim 13 wherein the raw access count and the access percentile are maintained in a bloom filter.

15. The system of claim 9 wherein creating a new file in the second constituent further comprises:
generating a private file in the second constituent;
allocating space for a buffer tree for the private file in the second constituent;
creating a public file in the second constituent, wherein the public file comprises the new file in the second constituent;
linking the public file to the buffer tree for the private file;
removing the link from the private file to the buffer tree.

16. The system of claim 9 wherein the new file in the second constituent comprises a part inode file and the multipart file comprises at least a link to a parts catalog having links to one or more part inode files that each comprise a portion of user data previously stored in the multipart file.

17. A method comprising:
receiving a write request at a first data storage node having a first set of interface module(s), a first set of data management module(s), and a first set of data storage devices, the write request indicating a target file to be written;
determining whether conditions on the first node indicate a bottleneck condition;
triggering a non-disruptive file move in response to determining conditions on the first node indicate the bottleneck condition;
converting the target file in a first constituent on the first node to a multipart file in the first constituent with a file location for the multipart file in the first constituent in response to the trigger, wherein the multipart file is created from the target file and utilizes a directory that indicates a plurality of nodes corresponding to the multipart file;
creating a new file in a second constituent;
moving contents of the target file to a new file on the second constituent while maintaining access to the target file via an associated file handle via access to the multipart file; and
deleting the target file from the first constituent.

18. The method of claim 17 further comprising:
receiving a subsequent request to move the new file from the second constituent to a third constituent;
creating a new file in the third constituent;
moving contents of the new file in the second constituent to the new file in the third constituent while maintaining access to the new file in the second constituent via the associated file handle and via access to the multipart file;
deleting the new file from the second constituent.

19. The method of claim 17 wherein moving contents of the target file to a new file in the second constituent while maintaining access to the target file via the associated file handle via access to the multipart file further comprises:
changing location information in a buffer tree for the multipart file from indicating the target file in the first constituent to indicating the new file in the second constituent;
updating a buffer tree associated with the new file in the second constituent to store inode data for the new file in the second constituent.

20. The method of claim 17 wherein determining whether conditions on the first node indicate a bottleneck condition comprises applying a points-based analysis based on queue latency.

21. The method of claim 20 wherein the points-based analysis is a function of at least raw access count and access percentile.

22. The method of claim 21 wherein the raw access count and the access percentile are maintained in a bloom filter.

23. The method of claim 17 wherein creating a new file in the second constituent further comprises:
generating a private file in the second constituent;
allocating space for a buffer tree for the private file in the second constituent;
creating a public file in the second constituent, wherein the public file comprises the new file in the second constituent;
linking the public file to the buffer tree for the private file;
removing the link from the private file to the buffer tree.

24. The method of claim 17 wherein the new file in the second constituent comprises a part inode file and the multipart file comprises at least a link to a parts catalog having links to one or more part inode files that each comprise a portion of user data previously stored in the multipart file.

* * * * *